(12) United States Patent
Turner et al.

(10) Patent No.: US 10,042,436 B2
(45) Date of Patent: Aug. 7, 2018

(54) ROLLING FOOT CONTROLLER

(71) Applicants: Michael Hughesdon Turner, Washington, DC (US); Christopher Ryan Byrnes, Palo Alto, CA (US); Thomas William Davison, Arlington, VA (US); Evan William Woolley, Los Angeles, CA (US); Ryan Patrick Murphy, Trabuco Canyon, CA (US)

(72) Inventors: Michael Hughesdon Turner, Washington, DC (US); Christopher Ryan Byrnes, Palo Alto, CA (US); Thomas William Davison, Arlington, VA (US); Evan William Woolley, Los Angeles, CA (US); Ryan Patrick Murphy, Trabuco Canyon, CA (US)

(*) Notice: Subject to any disclaimer, the term of this patent is extended or adjusted under 35 U.S.C. 154(b) by 492 days.

(21) Appl. No.: 14/677,805

(22) Filed: Apr. 2, 2015

(65) Prior Publication Data
US 2015/0286290 A1   Oct. 8, 2015

Related U.S. Application Data

(60) Provisional application No. 61/974,221, filed on Apr. 2, 2014.

(51) Int. Cl.
*G09G 5/00* (2006.01)
*G06F 3/033* (2013.01)
*A63F 13/211* (2014.01)

(52) U.S. Cl.
CPC .......... *G06F 3/0334* (2013.01); *A63F 13/211* (2014.09)

(58) Field of Classification Search
CPC ..................................................... G06F 3/0334
USPC ................................................. 345/156–167
See application file for complete search history.

(56) References Cited

U.S. PATENT DOCUMENTS

| 5,605,505 | A | 2/1997 | Han |
| 5,757,360 | A | 5/1998 | Nitta |
| 6,342,010 | B1 | 1/2002 | Slifer |
| 6,512,511 | B2 | 1/2003 | Willner |

(Continued)

OTHER PUBLICATIONS

"Wii Balance Board, Operations Manual," Nintendo, pp. 1-36, (2008). [Author Unknown].

(Continued)

*Primary Examiner* — Nelson Rosario
*Assistant Examiner* — Andrew Lee
(74) *Attorney, Agent, or Firm* — Alston & Bird LLP

(57) ABSTRACT

Various devices for providing foot controlled computing device inputs are discussed herein. Some embodiments may include a rolling foot controller including a housing, one or more motion sensors disposed within the housing, and processing circuitry. The housing may include an upper portion configured to interface with one or more feet, and a lower portion configured to facilitate motion of the rolling foot controller when disposed on a ground surface. The processing circuitry may be configured to receive the motion data generated by the one or more motion sensors, and provide the motion data to a computing device, especially with regards to rotation in the pitch, yaw, and roll directions. The upper portion is generally of convex shape, curved about one or more axes, and the lower portion is generally convex as well, curved about two or more axes.

18 Claims, 28 Drawing Sheets

(56) References Cited

U.S. PATENT DOCUMENTS

| | | |
|---|---|---|
| 6,545,661 B1 | 4/2003 | Goschy |
| 6,812,918 B2 | 11/2004 | Yang |
| 7,576,729 B2 | 8/2009 | Medina |
| 7,953,246 B1 * | 5/2011 | Tu .......................... G06F 3/017 |
| | | 382/103 |
| 8,197,315 B2 | 6/2012 | Nicolas |
| 2003/0117366 A1 | 6/2003 | Yang |
| 2008/0286733 A1 | 11/2008 | Claudel |
| 2009/0189854 A1 * | 7/2009 | Schwanecke ...... A63B 21/0004 |
| | | 345/156 |
| 2009/0215597 A1 * | 8/2009 | Fernandez ............. A63B 22/18 |
| | | 482/146 |
| 2011/0124387 A1 * | 5/2011 | Sauerbrei ................ A63F 13/10 |
| | | 463/7 |
| 2011/0269605 A1 * | 11/2011 | Kim ................... A63B 21/4035 |
| | | 482/121 |
| 2012/0135825 A1 | 5/2012 | Claudel |
| 2012/0258799 A1 | 10/2012 | Jouet |
| 2014/0035888 A1 * | 2/2014 | Levasseur ............... A63F 13/24 |
| | | 345/184 |

OTHER PUBLICATIONS

"Stinkyboard," Stinkyboard by Stelulu, 10 pages, (2015). [Retrieved from the Internet Mar. 31, 2015: <URL: http://stinkyboard.com/stinkyboard/>]. [Author Unknown].

"PhysioRoom.com Balance Wobble Board 40cm," PhysioRoom.com Limited, 3 pages, (2015). [Retrieved from the Internet Mar. 31, 2015: <URL: http://www.physioroom.com/product/PhysioRoom.com_Balance_Wobble_Board_40cm/3183/38994.html>]. [Author Unknown].

Miller, "Tony Hawk: RIDE's skateboard gets FCC'd, USB dongle required for PS3 and Wii," Engadget, 4 pages, (2009). [Retrieved from the Internet Mar. 31, 2015: <URL: http://www.engadget.com/2009/08/20/tony-hawk-rides-skateboard-gets-fccd-usb-dongle-required-for/>].

"The Real Balance Board, for Wii fit Balance Board," CTA Digital, Inc., 1 page, (2015). [Retrieved from the Internet Mar. 31, 2015: <URL: http://www.ctadigital.com/item.asp?item=2820>]. [Author Unknown].

* cited by examiner

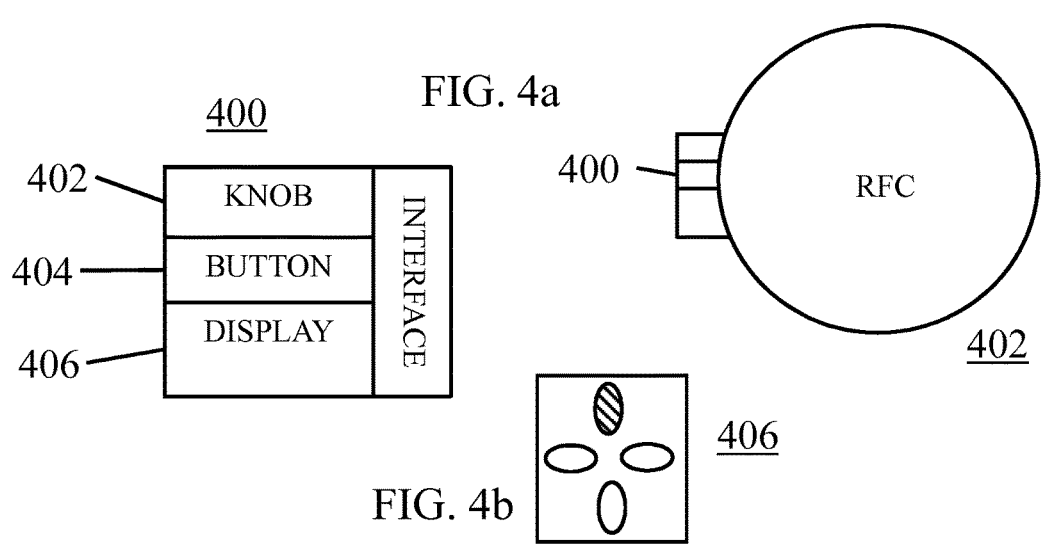
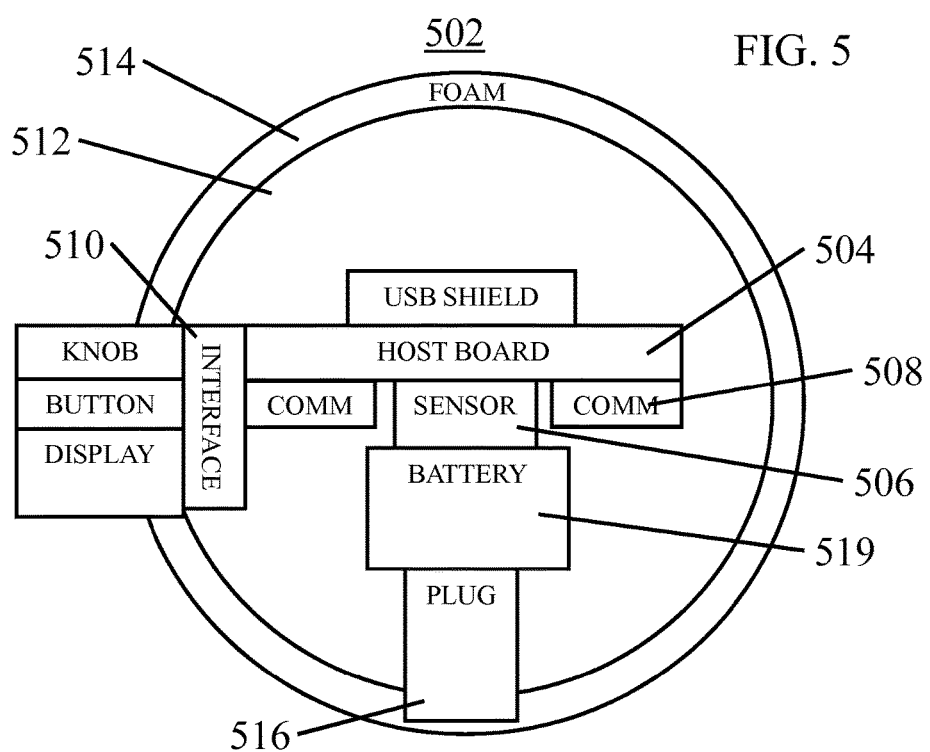

FIG. 14a
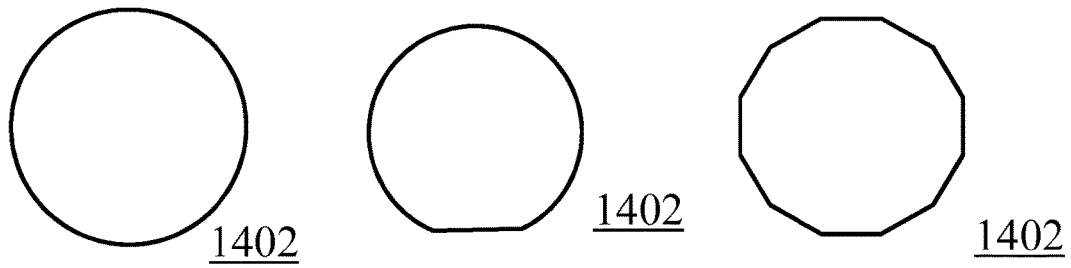
FIG. 14b
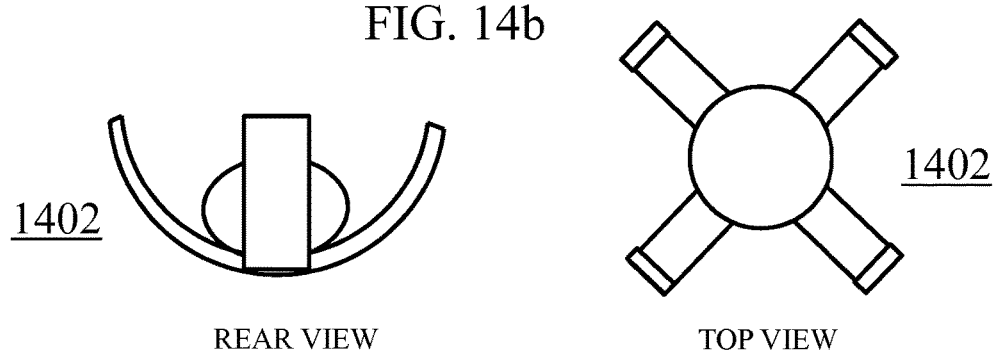
REAR VIEW                    TOP VIEW
FIG. 14c
FIG. 14d 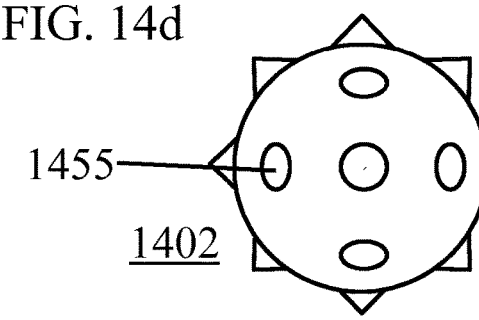 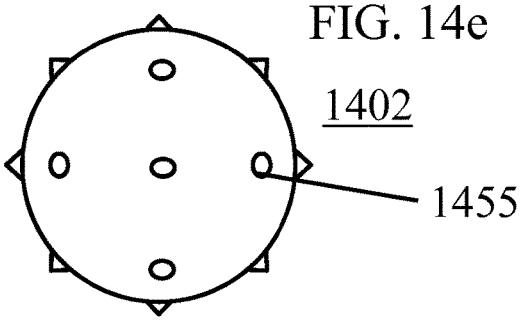 FIG. 14e

YAW LEFT 1502

YAW RIGHT

TOP VIEW    SIDE VIEW

FIG. 16
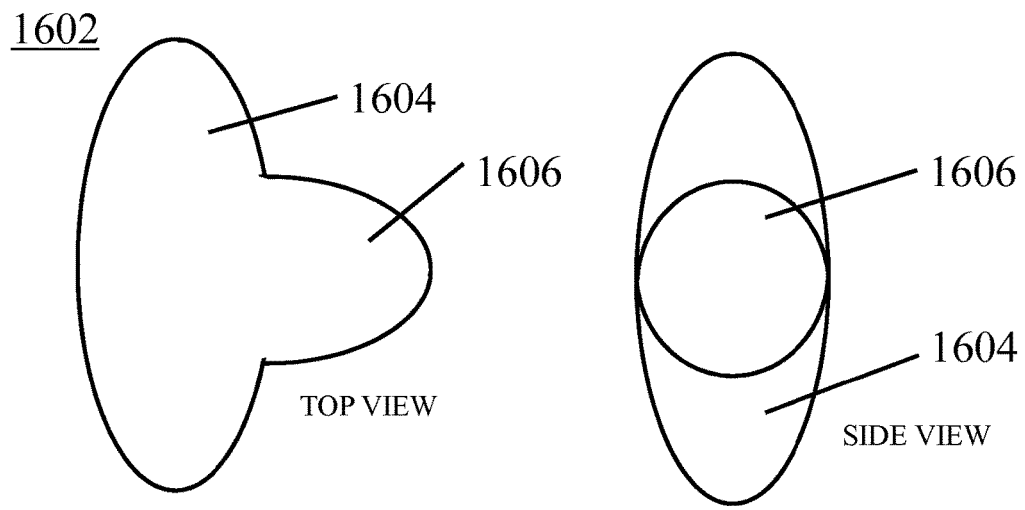
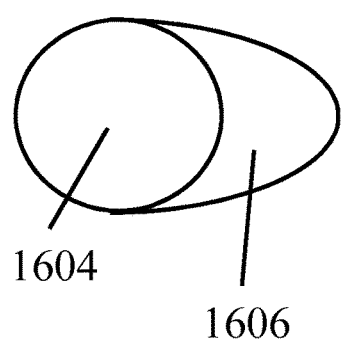
FIG. 17
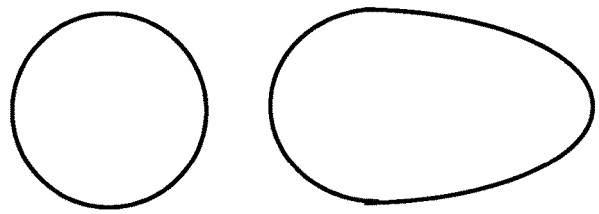

FIG. 23
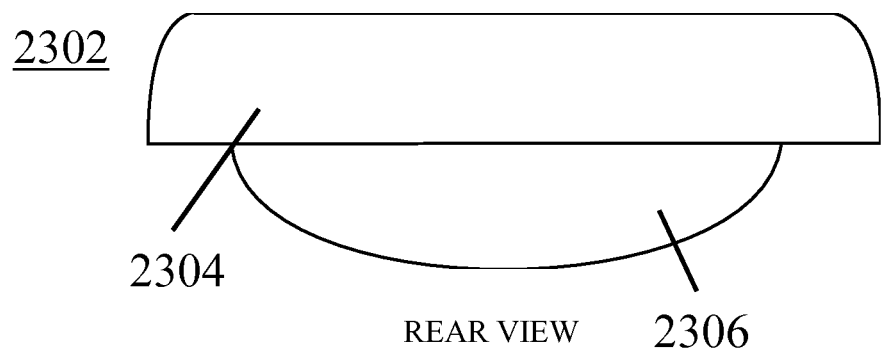
REAR VIEW
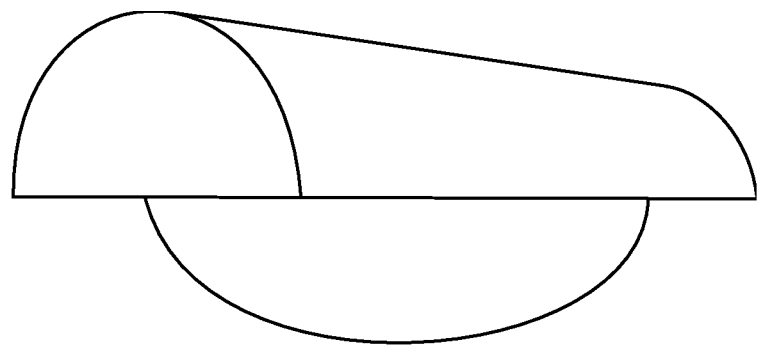
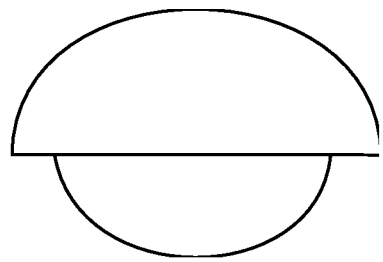
SIDE VIEW

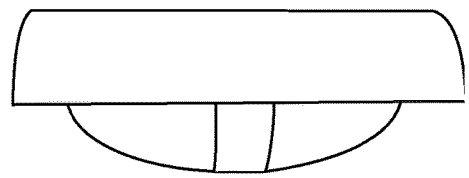
FIG. 24
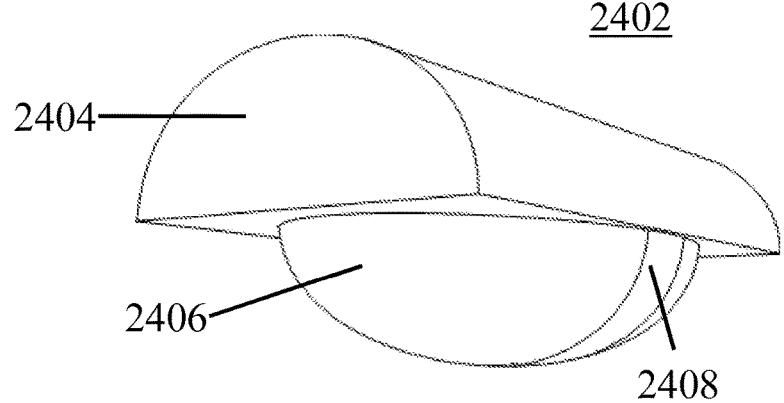
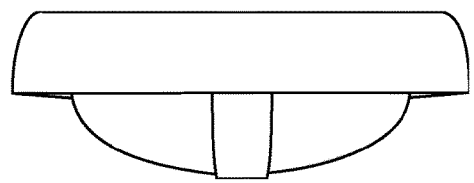
FIG. 25
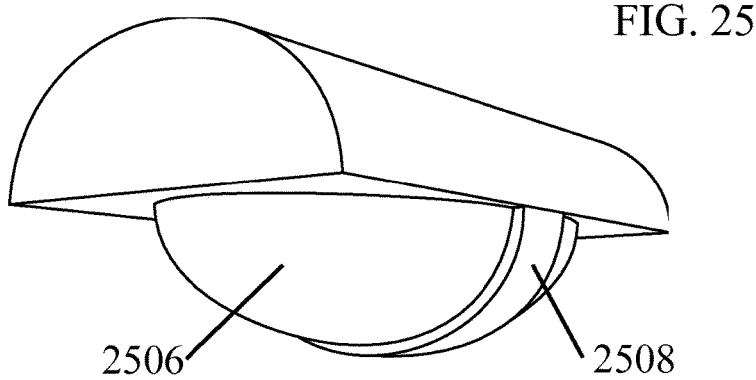

FIG. 26
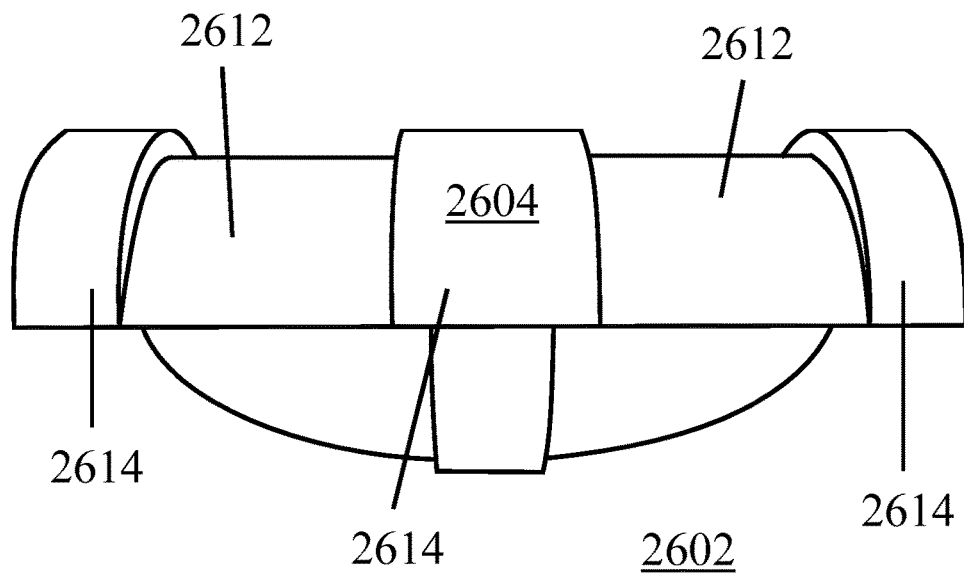
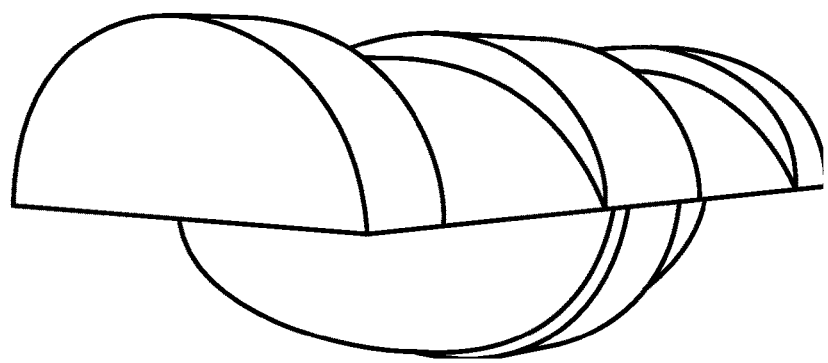

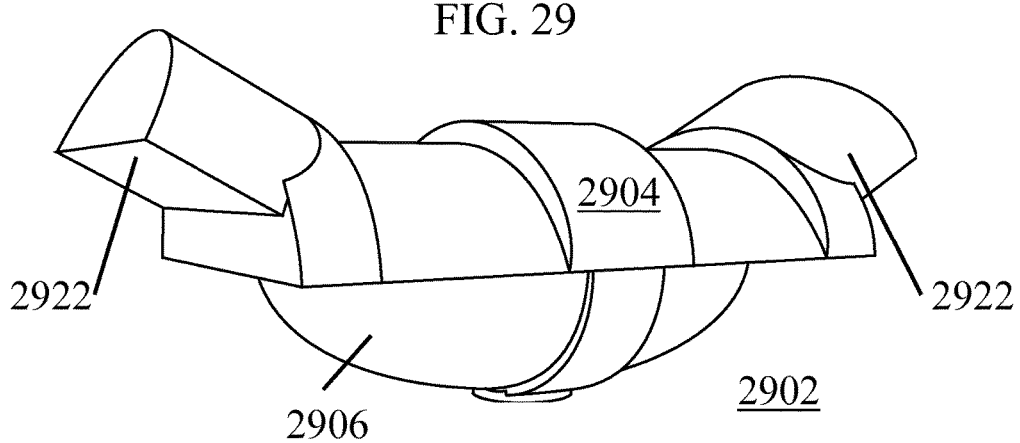
FIG. 29
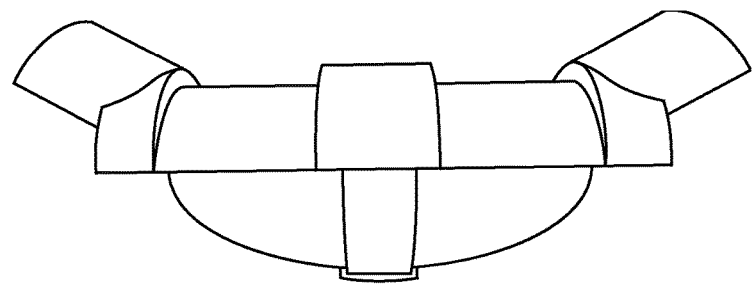
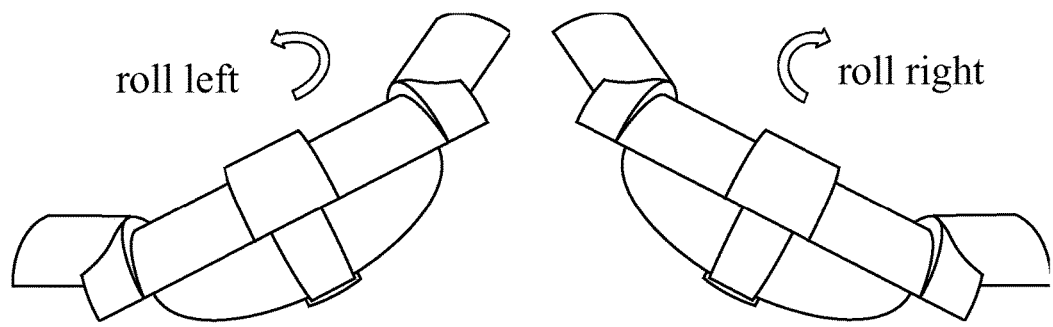
FIG. 30a      FIG. 30b

FIG. 31
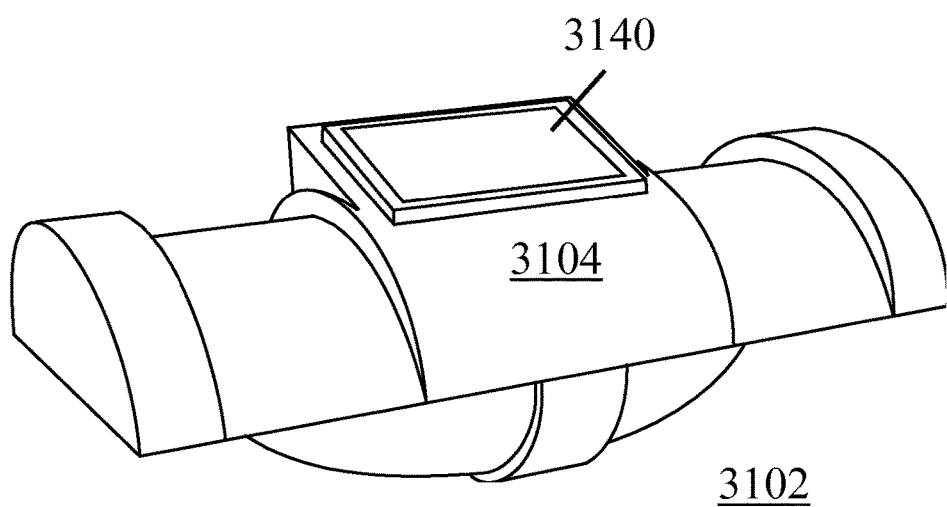
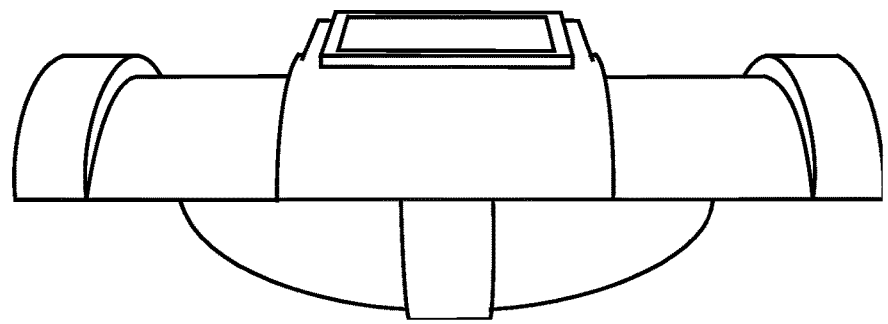

FIG. 34a
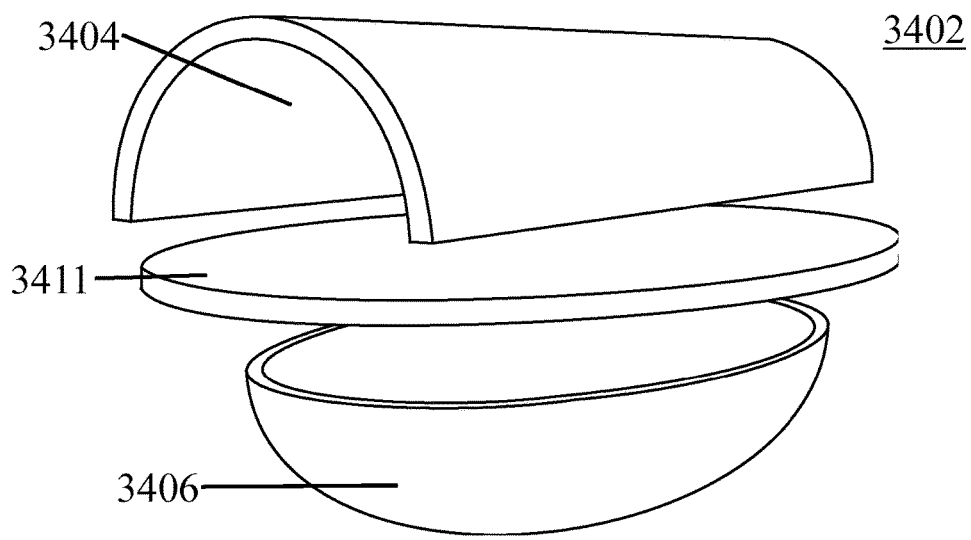
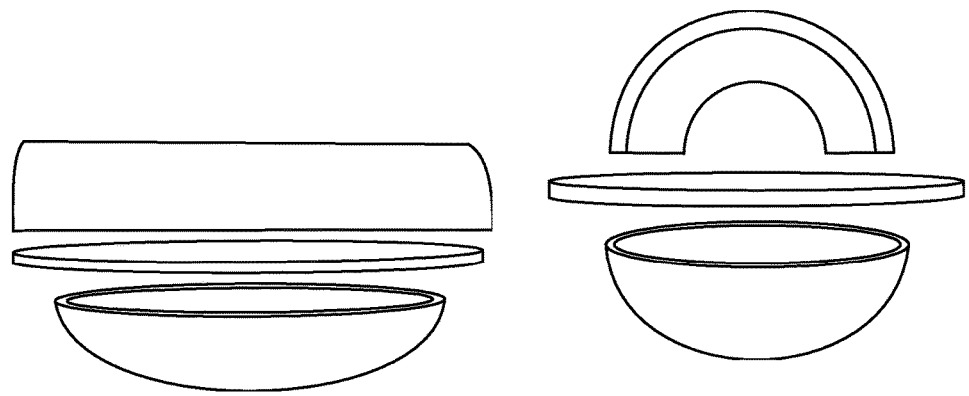

FIG. 35
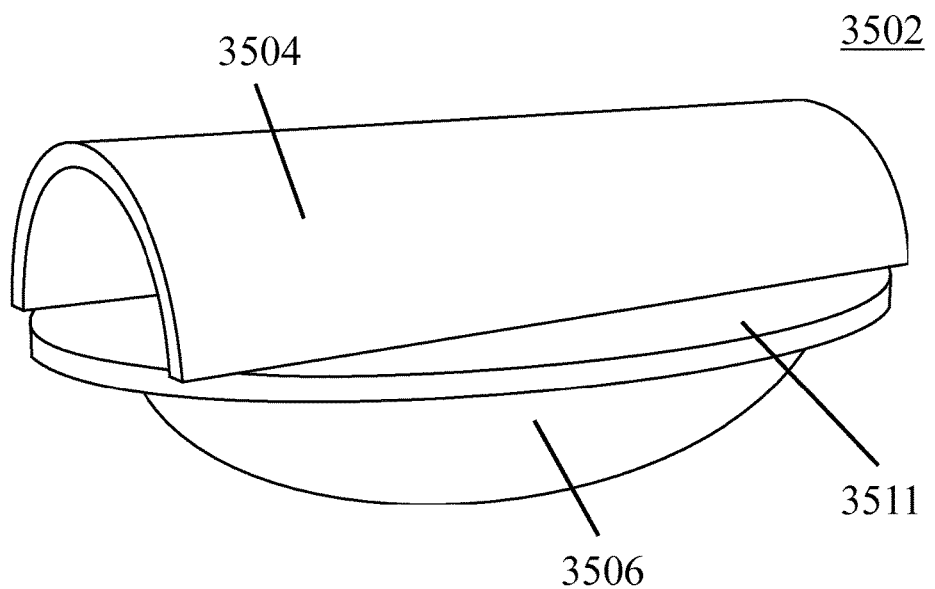
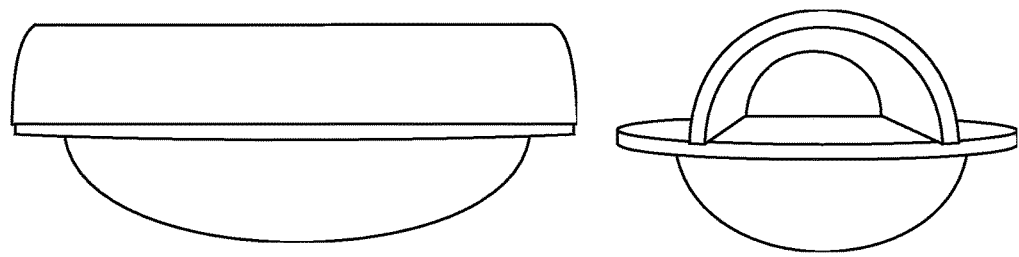

FIG. 36
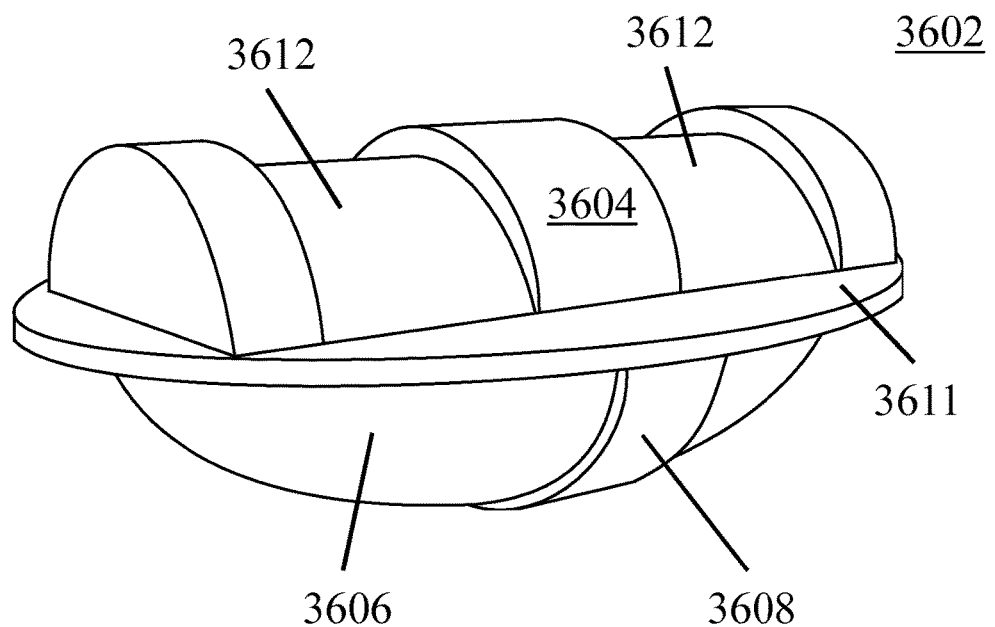
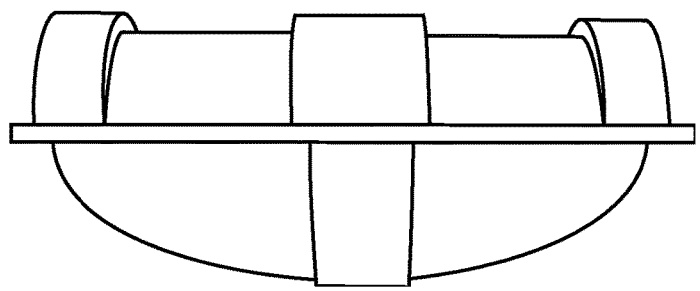

FIG. 37
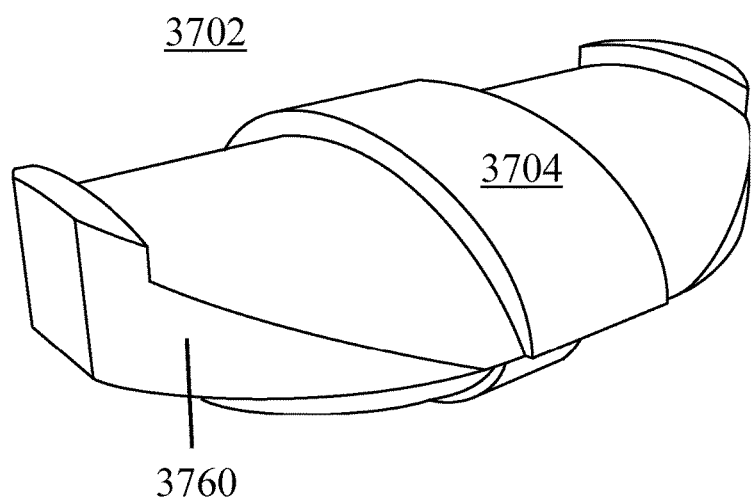
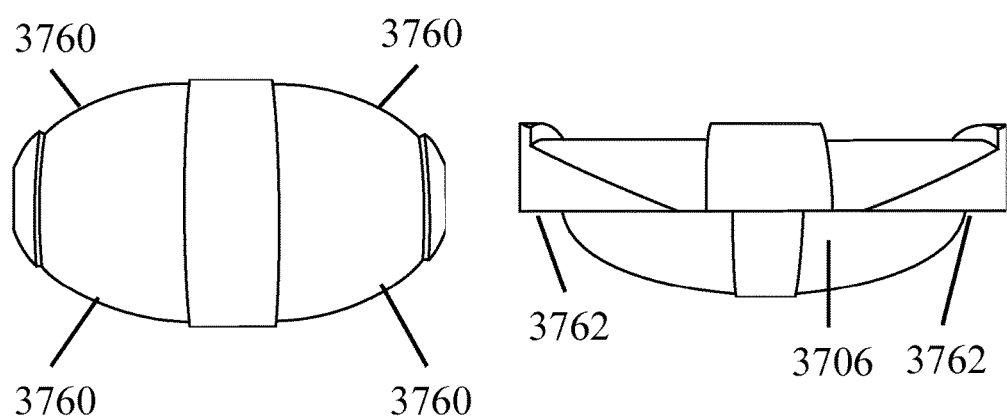

ROLLING FOOT CONTROLLER

CROSS-REFERENCE TO RELATED APPLICATIONS

The present application for patent claims priority under 35 U.S.C. § 119 to Provisional Application No. 61/974,221 entitled "Rolling Foot Controller," filed Apr. 2, 2014.

FIELD

Embodiments of the invention relate, generally, to foot controlled computer input devices.

BACKGROUND

Within the video game industry, game developers and console manufacturers are increasingly focused on improving game player immersion. In this context, immersion is the phenomenon where the player feels that they are physically in the environment of the gameplay experience, such as when the player identifies with a character (e.g., a graphical avatar) in the game. See Laura Ermi & Frans Mayra, *Fundamental Components of the Gameplay Experience: Analyzing Immersion*, WORLDS IN PLAY: INTERNATIONAL PERSPECTIVES ON DIGITAL GAMES RESEARCH, Suzanne de Castell & Jennifer Jenson, eds., Peter Lang Publishing, Inc. New York, p. 40 (2007). Immersion is associated with increased focus on and enjoyment of the game, and more sustained gameplay. See Kevin Cheng & Paul A. Cairns, *Behaviour, realism, and immersion in games*, CHI 2005 EXTENDED ABSTRACTS ON HUMAN FACTORS IN COMPUTING SYSTEMS, Association for Computing Machinery, p. 1272 (2005). Game developers realize, and research has corroborated, that immersion can be effectively achieved by linking a player's physical movements in the real world to the movements reflected in the video game environment. See Nadia Bianchi-Berthouze et al., *Does Body Movement Engage You More In Digital Gameplay? And Why?* AFFECTIVE COMPUTING AND INTELLIGENT INTERACTION, Springer Berlin Heidelberg, p. 112 (2007).

However, the industry's efforts often come in the form of improved visuals and storytelling, and only occasionally in the way players physically interact with the games. As an example, almost all games, whether they be action, adventure, sports, or simulation, are primarily based in a user controlling gameplay through their hands; specifically, the thumbs and fingers. This is true regardless of whether the gameplay actually involves actions commonly associated with a game character's hands, feet, or head. The present invention seeks to solve this deficiency in current methods and systems by engaging portions of a player's body, other than the hands, in the control of the video game character, or other electronic user interface.

BRIEF SUMMARY

Through applied effort, ingenuity, and innovation, solutions to improve user interface devices have been realized and are described herein. Some embodiments may provide for a rolling foot controller ("RFC") configured to enable fine joystick-like control by a user's body apart from the hands without exhausting the player. In this way, the RFC creates a more intuitive link the virtual environment of the game and reality.

These characteristics as well as additional features, functions, and details of various embodiments are described below. Similarly, corresponding and additional embodiments are also described below.

BRIEF DESCRIPTION OF THE DRAWINGS

Figure 1A:
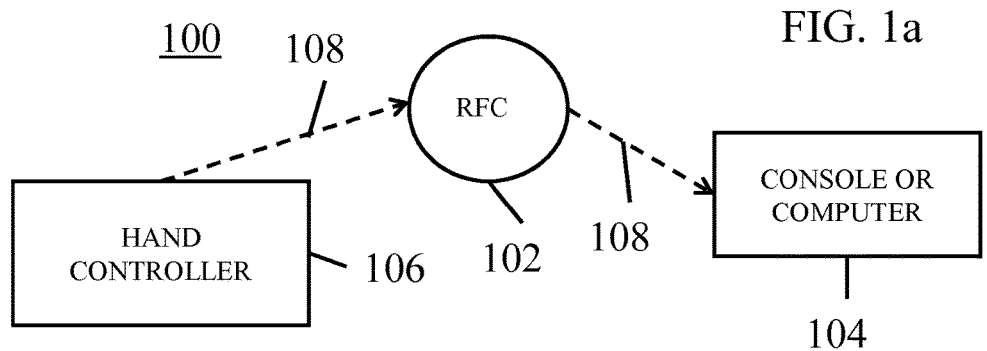
Figure 1B:
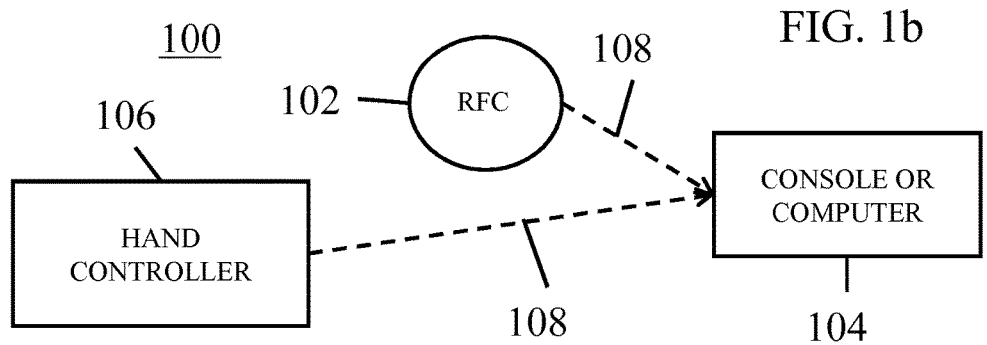
Figure 1C:
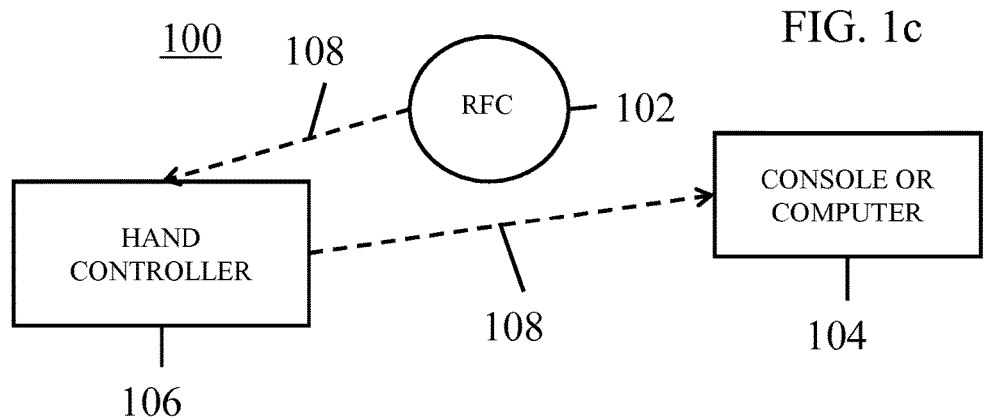

Having thus described some embodiments in general terms, reference will now be made to the accompanying drawings, which are not necessarily drawn to scale, and wherein:

FIGS. 1a-1c show examples of a controller system in accordance with some embodiments.

Figure 2:
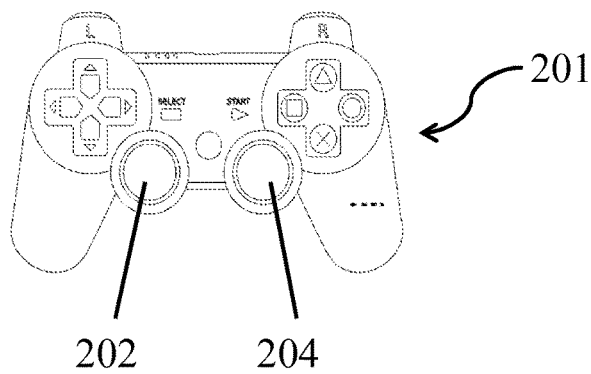

FIG. 2 shows an example of a prior art hand controller in accordance with some embodiments.

Figure 3A:
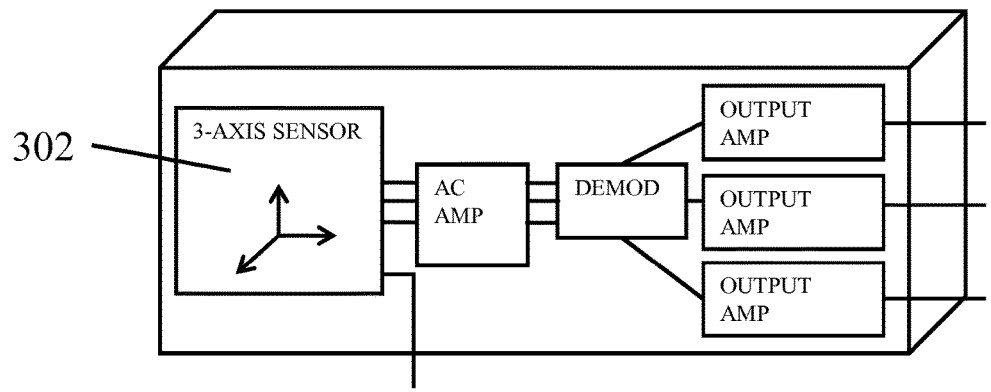
Figure 3B:
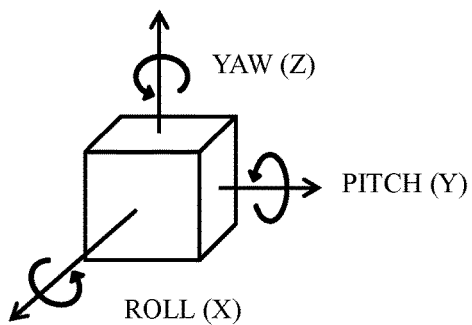

FIGS. 3a and 3b show an example of sensing instrumentation in accordance with some embodiments.

FIG. 4a shows an example control interface in accordance with some embodiments;

FIG. 4b shows an example display in accordance with some embodiments.

FIGS. 5-8 show examples of component arrangement in accordance with some embodiments.

Figure 9:
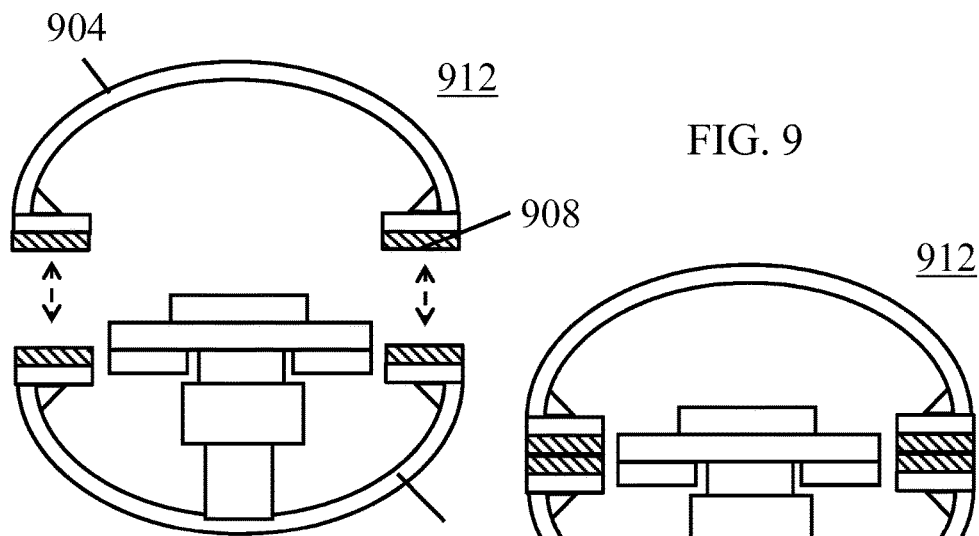
Figure 10:
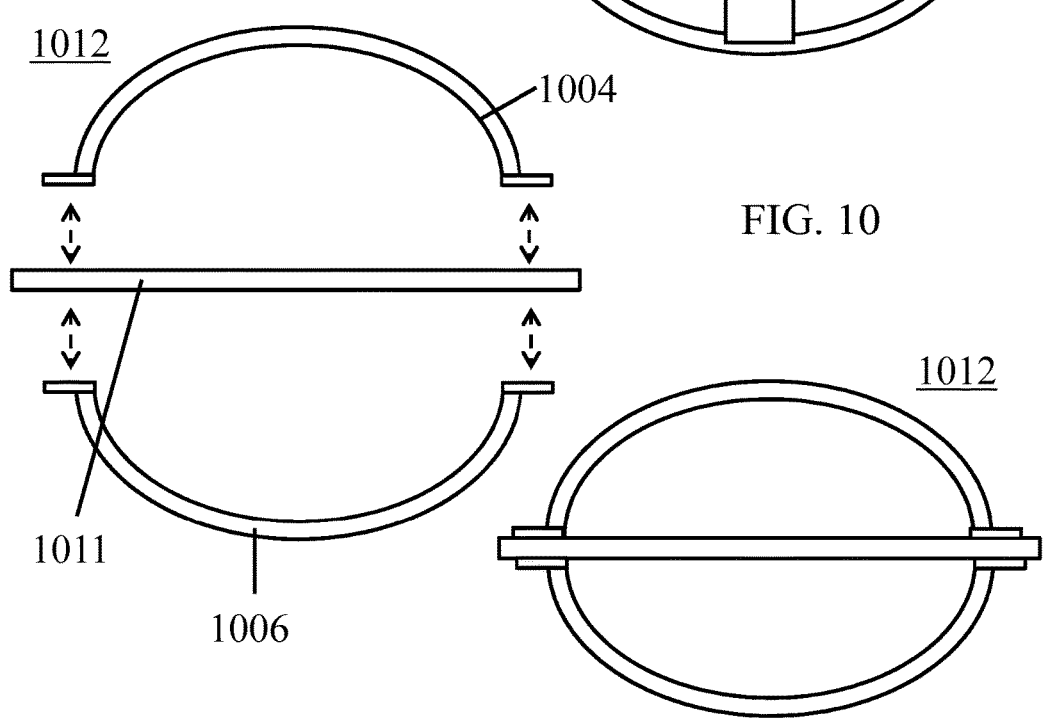
Figure 11:
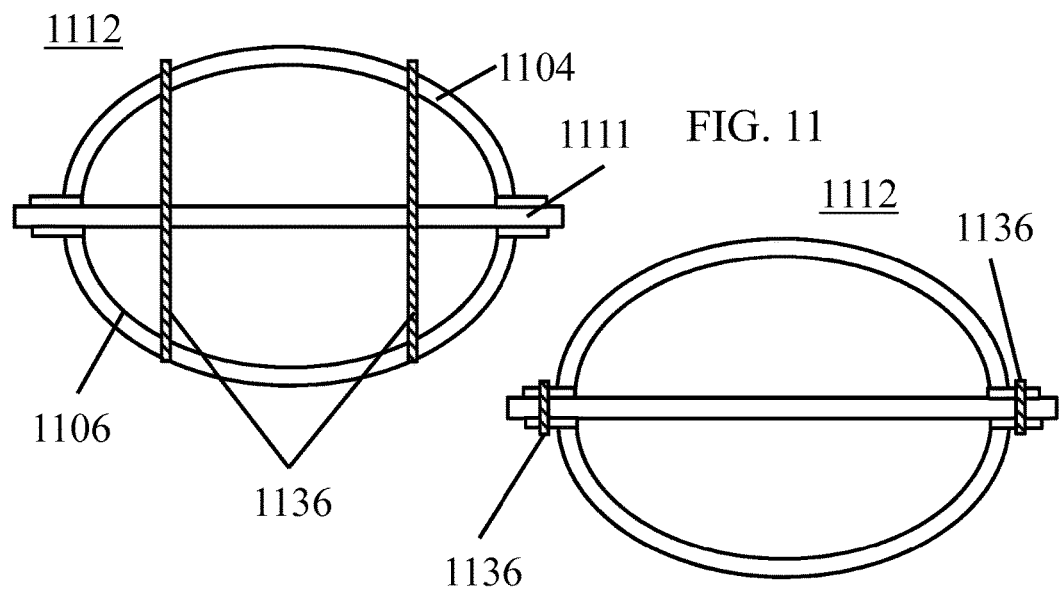

FIGS. 9-11 show example housing arrangements in accordance with some embodiments.

Figure 12:
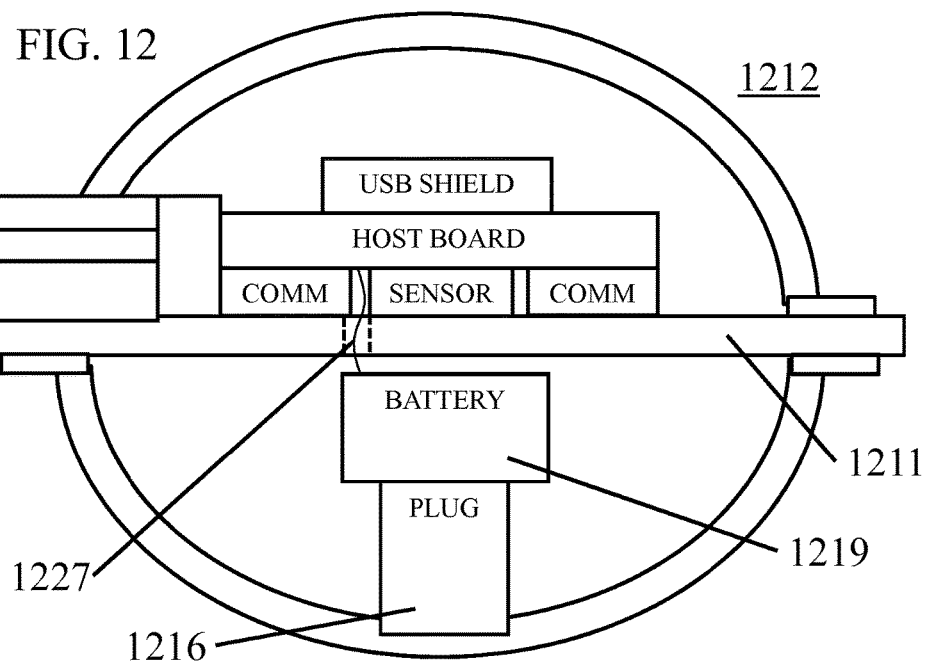

FIG. 12 shows an example housing and component arrangement in accordance with some embodiments.

Figure 13A:
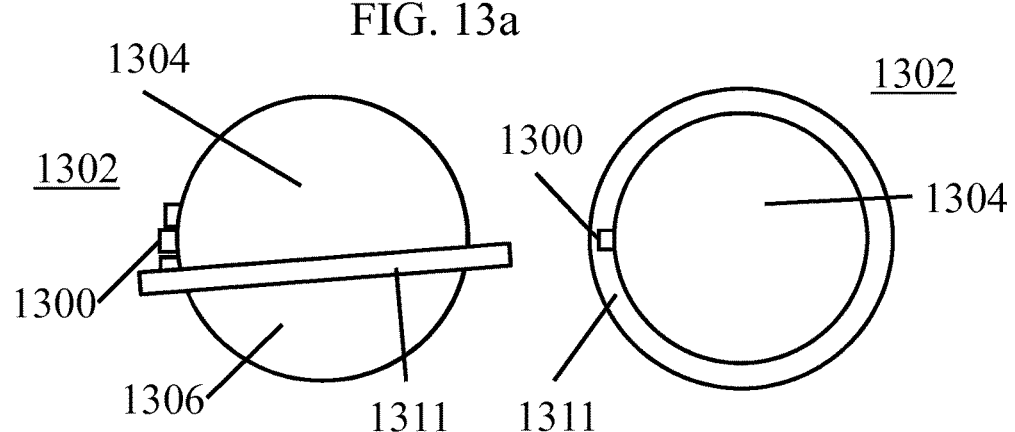
Figure 13B:
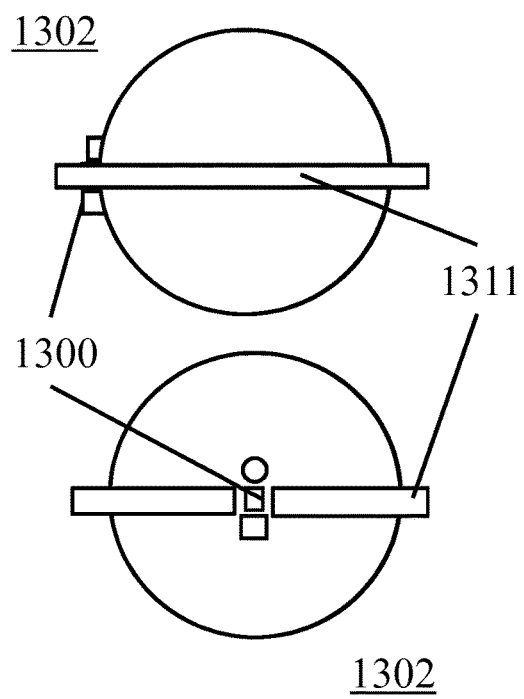
Figure 13C:
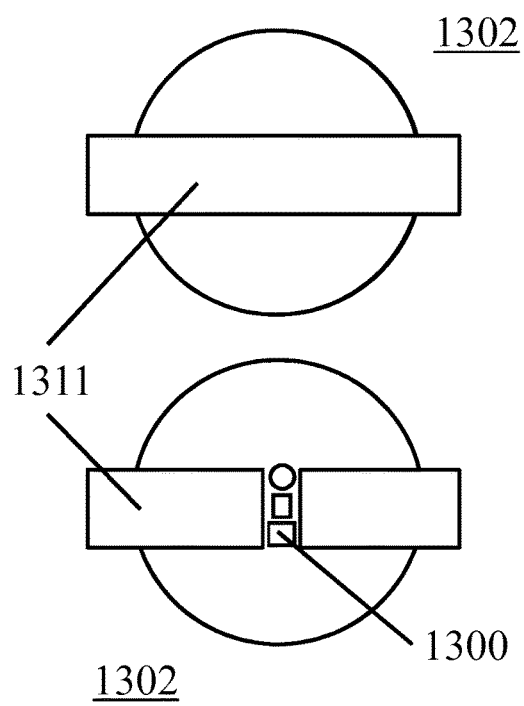

FIGS. 13a-13c show examples of housing arrangements in accordance with some embodiments.

FIGS. 14a-14e show examples of housing arrangements in accordance with some embodiments.

Figure 15A:
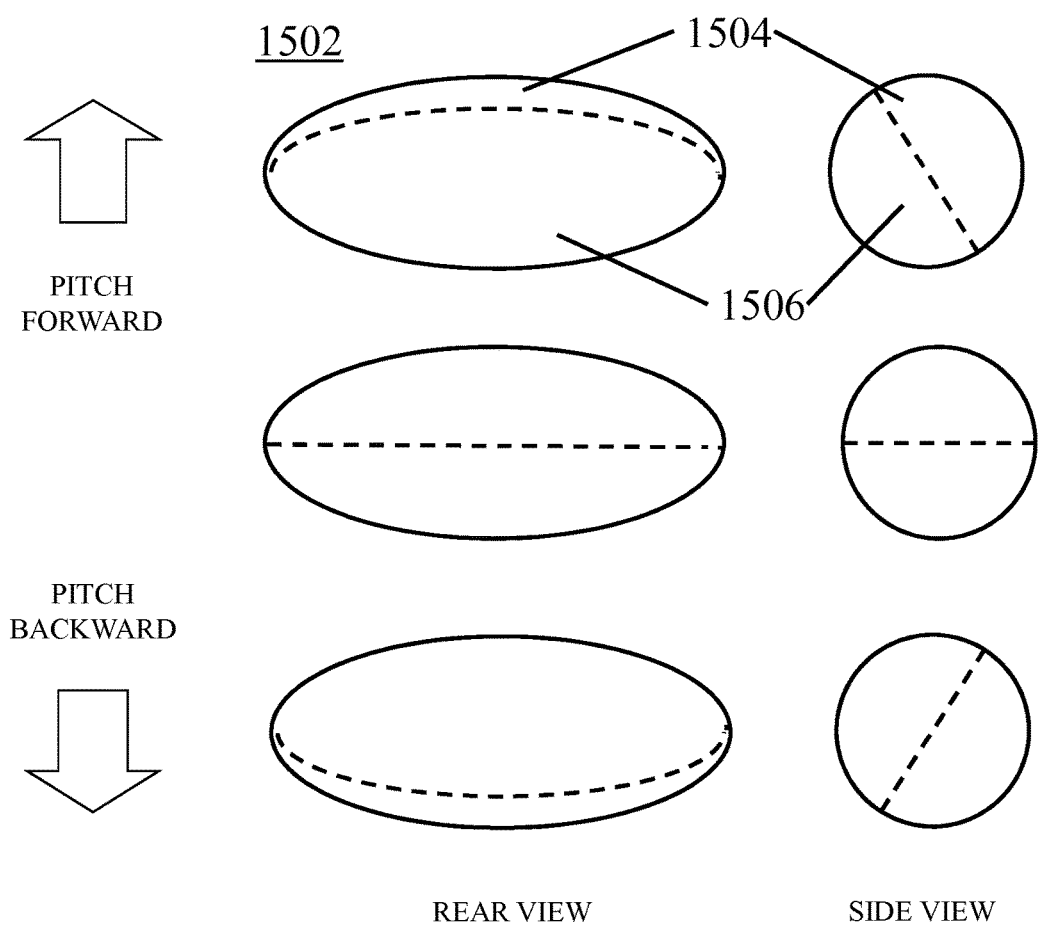
Figure 15B:
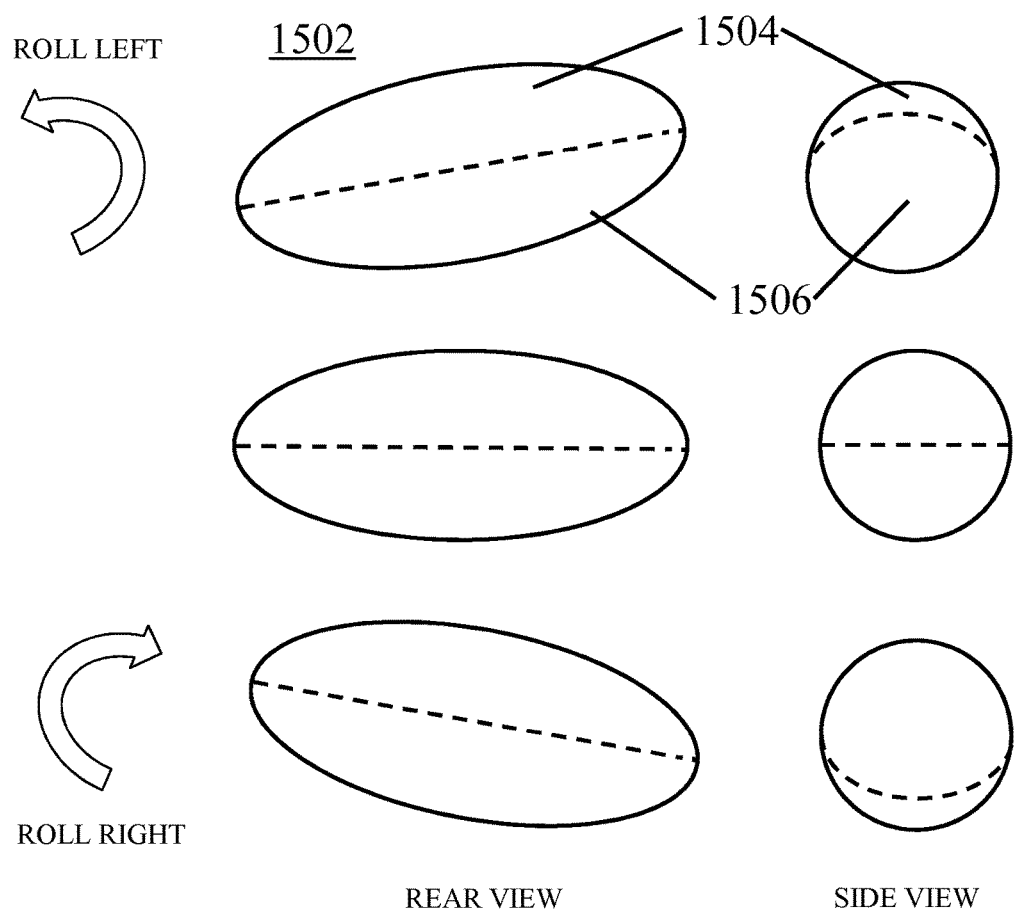
Figure 15C:
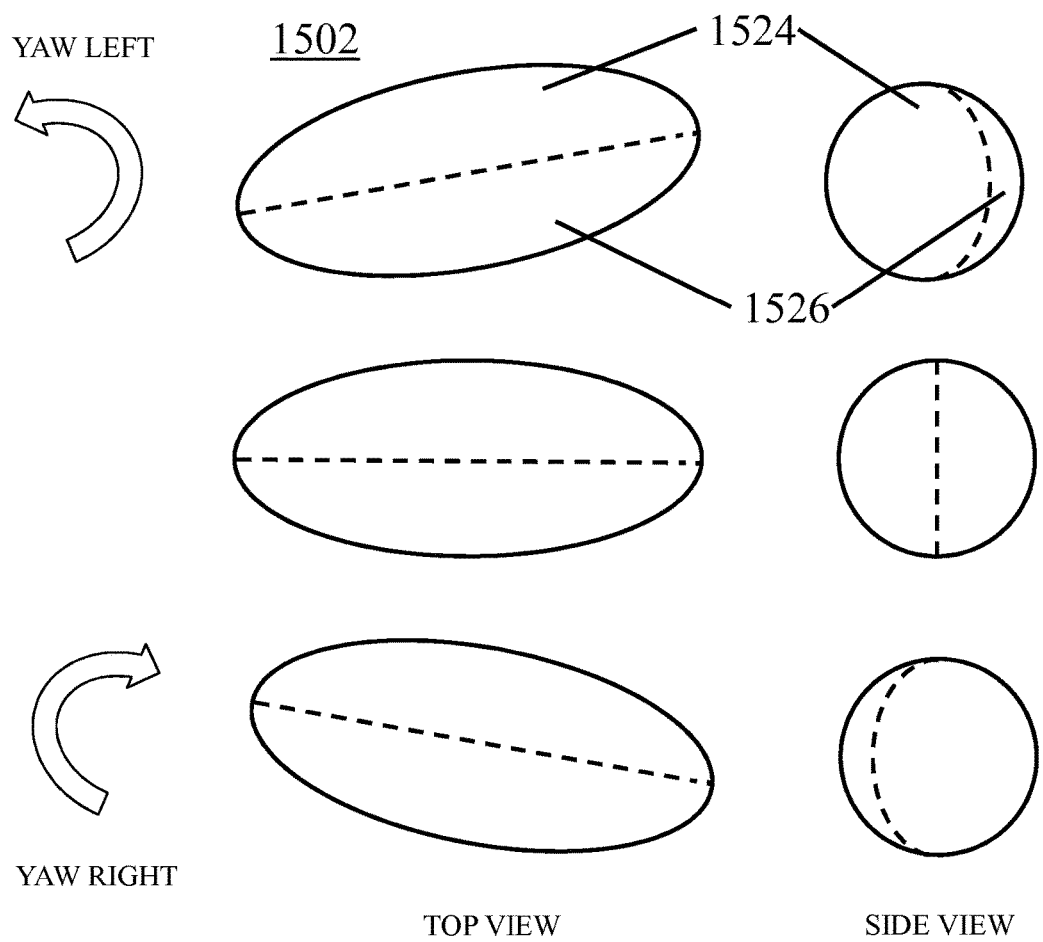

FIGS. 15a-15c show principles of housing movement in accordance with some embodiments.

FIGS. 16 and 17 show example housing arrangements in accordance with some embodiments.

Figure 18:
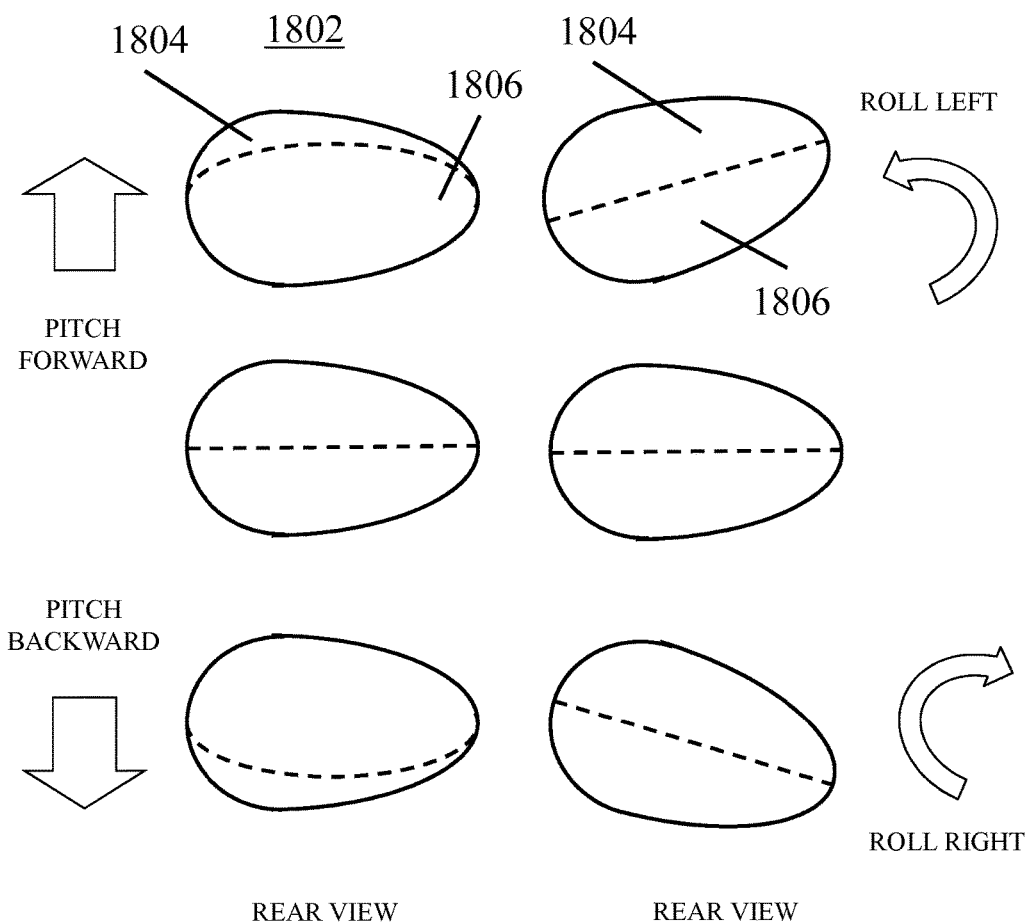
Figure 19:
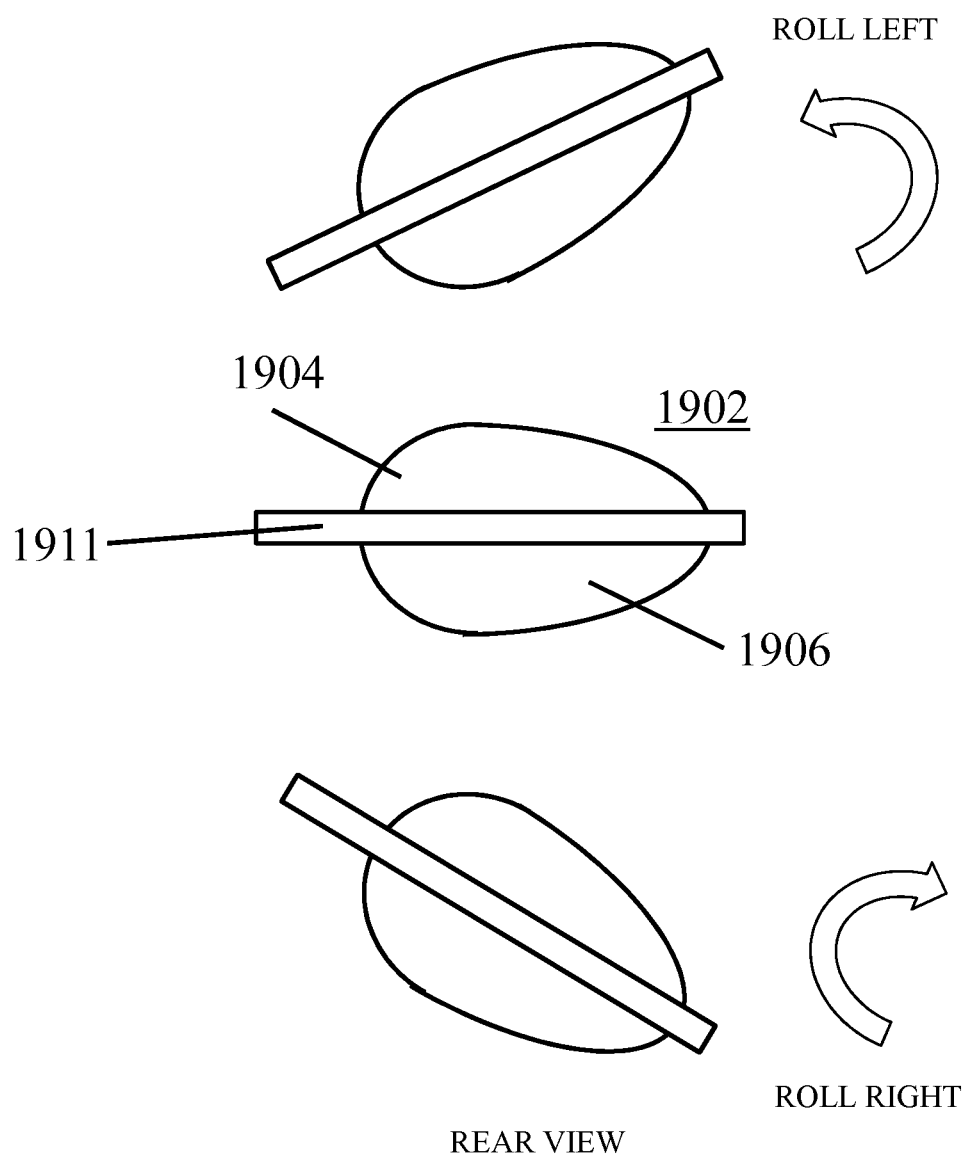

FIGS. 18 and 19 show principles of housing movement in accordance with some embodiments.

FIGS. 20 and 21a-21c show examples of modular housing arrangements in accordance with some embodiments.

Figure 22A:
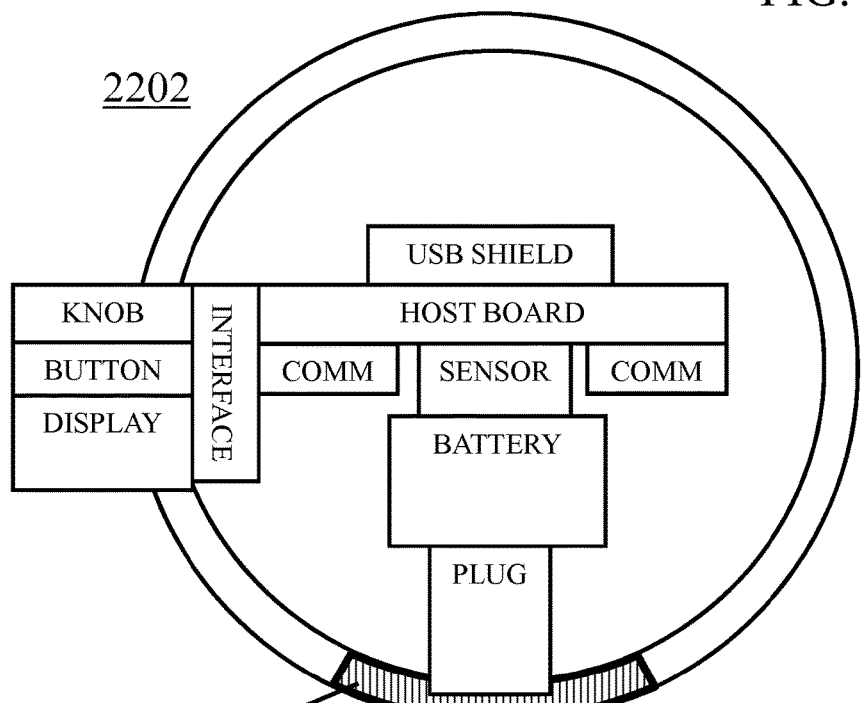
Figure 22B:
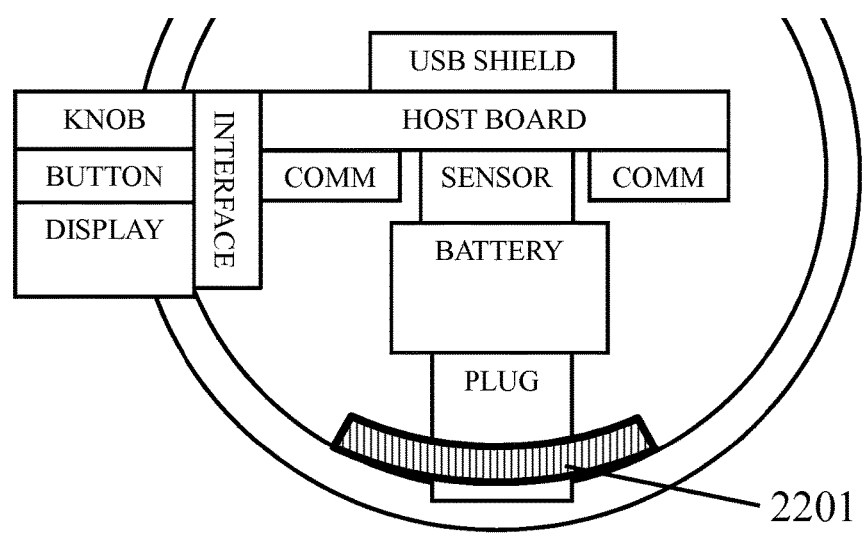

FIGS. 22a and 22b show examples of component arrangements in accordance with some embodiments.

FIGS. 23-37 show examples of housing arrangements in accordance with some embodiments.

DETAILED DESCRIPTION

Embodiments will be described more fully hereinafter with reference to the accompanying drawings, in which some, but not all embodiments contemplated herein are shown. Indeed, various embodiments may be implemented in many different forms and should not be construed as limited to the embodiments set forth herein; rather, these embodiments are provided so that this disclosure will satisfy applicable legal requirements. Like numbers refer to like elements throughout.

FIGS. 1a-1c show examples of system 100 in accordance with some embodiments. System 100 may include a rolling foot controller ("RFC") 102, a computing device 104, and a hand controller 106.

In some embodiments, the RFC 102 may be configured to operate as an add-on or aftermarket addition to Original Equipment Manufacturer ("OEM") console 104 and controller 106 setups, or, alternatively, the RFC 102 may be incorporated into those OEM console 104 and controller 106 designs.

With reference to an example embodiment shown in FIG. 1a, the RFC 102 may be configured to be inserted as an intermediary in this communication path, receiving signals from the hand controller 106, combining or replacing them with input signals generated by the RFC 102, and sending the resulting overall signal to the computing device 104 (e.g., a console or computer which runs a game). The connection paths 108 shown may be wired or wireless. Wireless connections can include wireless network protocols associated with Personal Area Networks ("PANs"), such as the Bluetooth or ZigBee standards or other proprietary protocols as used by the computing device 104. For wireless connections the RFC 102 will contain at least a wireless transmitter or transceiver that will communicate signals from the RFC 102 to a wireless receiver or transceiver connected to the computing device 104.

FIG. 1b shows an alternative communication path for the system 100, RFC 102 communicates its generated input signals directly to the computing device 104 (such as through a wired connection, or a wireless connection), which combines them with the signals sent by the hand controller 106, before using them to control gameplay. With reference to FIG. 1c, showing yet another alternative communication routing, the RFC 102 may communicate its input signals to the hand controller 106, which if so configured, may sum, incorporate, or replace them with its other input signals before communication to the computing device 104.

FIG. 2 shows an example of a prior art hand controller 201 in accordance with some embodiments. Hand controller 201 may include joysticks 202 and 204, and a number of buttons to be operated with thumbs or fingers. These joysticks and buttons are generally displacement-sensitive with varying magnitudes of input signal generation based on how far they are depressed or angled. In some embodiments, the RFC 102 may be designed to emulate and/or replace signals generated by the left joystick 202, as that is the joystick that is commonly used for character movement during gameplay. This is contrasted with the right joystick 204, which is commonly used for character vision control (e.g., turning left or right, facing up or down, etc., in place and with no character translational movement).

In this way, the advantages of the RFC are apparent as it increases video game immersion by engaging parts of the user's body for character movement on screen that are more closely related than the user's hand, fingers, or thumb. Instead of moving a character with a thumb-operated joystick (e.g., left joystick 202), the player moves the character by engaging one or more feet with the RFC 102. The character movements are thus more intuitively linked to the user's experience, because game character movement is commonly represented on screen by movement of the character's feet and legs, not the character's hand, fingers, or thumb.

FIGS. 3a and 3b show examples of the principles of the sensors within the RFC 102 in accordance with some embodiments which measure the movement of the RFC 102. In some embodiments, the RFC 102 may be placed on the ground and operated with a user's foot or feet. For ease of description, the movement of the RFC 102 is characterized by pitch, roll, and yaw rotations where roll refers to rotation about the x-axis, pitch refers to rotation about the y-axis, and yaw refers to rotation about the z-axis. The user is able to control the roll, pitch, and yaw of the RFC 102 with their feet. The RFC then captures that movement with a motion sensor 302, which may be a single sensor or an array of sensors. The motion sensor 302 may be a position and/or motion sensing device such as an accelerometer, gyroscope, magnetometer, and/or other microelectromechanical system ("MEMS device"). The motion sensor 302 may preferably be a three-axis accelerometer, or three one-axis accelerometers. It may alternatively be a two axis accelerometer and a gyroscope. For measuring yaw, the inclusion of a magnetometer may be needed. The sensor arrangement may also be a single integrated circuit ("IC") package containing a combination of accelerometers, gyroscopes, and magnetometers which are often marketed as Inertial Measurement Units ("IMUs"). Other sensors are envisioned as well that, through direct sensing or other calculations, capture rolling, yaw, or pitch of the RFC 102. In many embodiments the sensor output will be comprised of analog data. The sensor output is converted from analog form to digital form by an analog-to-digital converter ("ADC"), as is typical in the art, within the RFC 102. The ADC may be a distinct circuit or IC package, or it may be intrinsic to an IC. The resulting analog or digital signals, typically vectors, may undergo mathematical operations by way of an on-board microprocessor to provide values output to a game console, or other computer, in a preferable scaled range of 0-255 for each desired direction of movement (e.g., leftHatX=0-255; leftHatY=0-255).

In a preferred embodiment the on-board microprocessor may be included as part of a single-board microcontroller. The software required for signal computation, signal translation, and communication gateway is resident within the microcontroller/microprocessor. This software may be stored on one or multiple partitions and a means for updating or upgrading this software via firmware update may be included (or a means of switching between separate software partitions). In a preferred embodiment, the user can select to place the RFC software into a reconfiguration mode via a button press, as in an interface described below, or other form of dedicated messaging. In this mode, the software data loader can accept firmware updates (via an external communication port—e.g., USB) to reconfigure the format of the data output/messages provided to the communication gateway such that it can be interpreted by other consoles, computers, or interfaces. This may also allow for a platform that permits customizable mapping between the hand controller 106 and the RFC 102.

Preferably, the sensor or sensors 302 retain a fixed reference direction for measuring changes in acceleration, making the device orientation dependent. In an alternative embodiment, the accelerations detected by the sensors 302 are normalized to the local gravitational field vector, making the device orientation independent. This calibration can occur upon powering up the RFC 102, or at another time of the user's choice.

FIG. 4a shows an example interface 400 of an RFC 402 in accordance with some embodiments which is used to control settings of the RFC 402. The RFC 402 may measure its movement as an input signal and convert the input signal into a format compatible with the computing device 104 (not shown). In some embodiments, the RFC 402 may include an interface 400 to provide user configuration of the RFC 402. The interface 400 can include a power switch or button 404 for turning the RFC 402 on and off and, when on, initiating a communication link with the computing device 104. It can also include a sensitivity adjustment system or knob 402, for adjusting the ratio between the measured accelerometer, or other sensor, signals and the magnitude of the signals sent to the computing device 104. This system 402 may apply uniformly to all sensor readings or may include means for individual adjustment for each of the forward pitch, backward pitch, left roll, right roll, left yaw, and right yaw directions. It may also include means for orientation polarity adjustment, where, for example: left roll movement is transmitted as right roll movement, forward pitch movement is transmitted as backward pitch movement, left yaw movement is transmitted as right yaw movement, etc. It may also include means for orientation direction adjustment, where, for example, left roll movement is transmitted as backward pitch movement, forward pitch movement is transmitted as right roll movement, right roll movement is transmitted as forward pitch movement, left roll movement is transmitted as backward pitch movement, etc. The orientation direction adjustment means can be particularly useful for those video games in which the user would be inclined to orient themselves to the RFC at a transverse angle (i.e. feet are arranged forward-back instead of left-right).

To facilitate the user's understanding of the status of RFC 402, the interface 400 may also include a status indicator or display 406, such as one or multiple LED lights, to indicate when the RFC 402 is powered on or off, when the RFC 402 is initiating communication links, when there is an operational error, or in which orientation polarity or orientation direction arrangement the RFC 402 is operating in. An example display is shown in FIG. 4*b*, which includes four LED lights arranged in a cross, where each light corresponds to a side of the RFC, and is lit in such a manner to display the orientation polarity or orientation direction arrangement settings as described above. For example, a singly lit LED may indicate that the corresponding side of the RFC is currently designated as the forward pitch direction of movement, thus quickly informing the user of how RFC 402 movement will be communicated to the computer system 104.

FIGS. 5-8 show examples of how the different electrical components may be arranged. With reference to FIG. 5, the RFC 502 may include a number of components to accomplish its function: a battery or other power source 519, a host board 504 (e.g., with processor and BIOS systems), one or more sensors 506, one or more wired or wireless communication buses 508, and an interface bus 510. The RFC housing 512 is preferably rigid to support the weight and forces put thereon by a user's feet. Suitable materials include hard plastic, such as ABS, a metal such as aluminum or steel, or a combination thereof. Preferably, such materials are waterproof or water resistant, as well as washable with standard household cleaning products. The RFC housing 512 is generally ball-shaped and the internal components preferably do not interrupt the external contours of the housing, with the possible exception of the interface bus 510 and associated input devices. It is advantageous to have the input devices and displays connected to interface bus 510 accessible from outside the RFC 502 so that a user may interact with them without taking apart the device. These components can be arranged in a number of configurations as shown in FIGS. 5-8.

Figure 6:
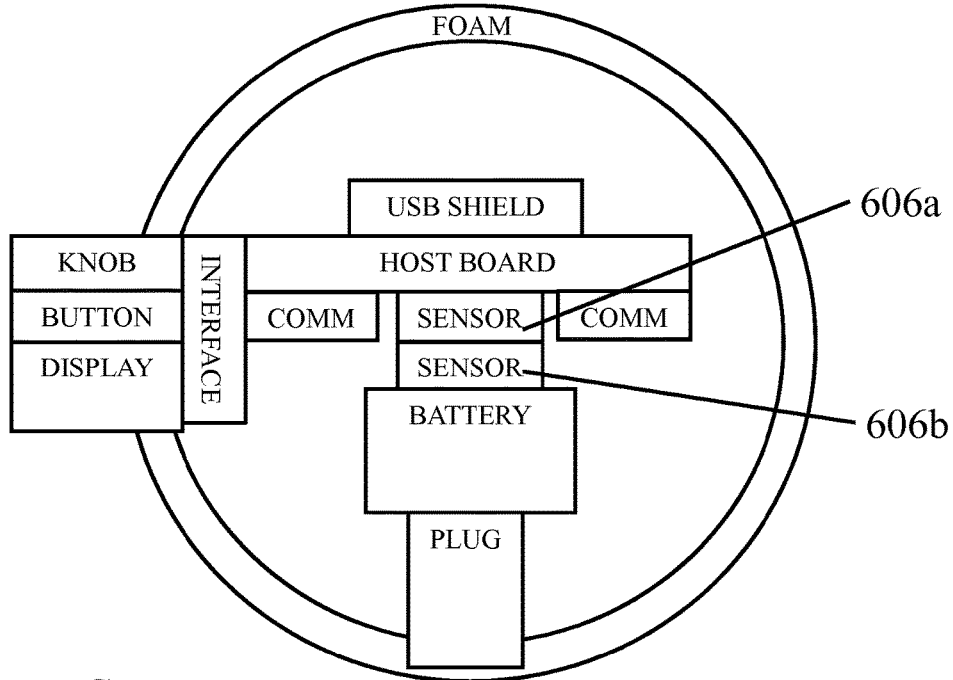
Figure 7:
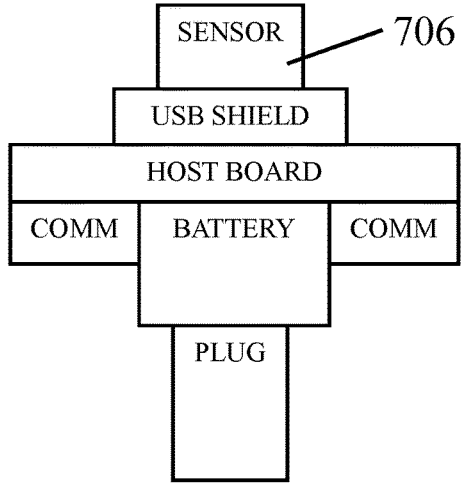
Figure 8:
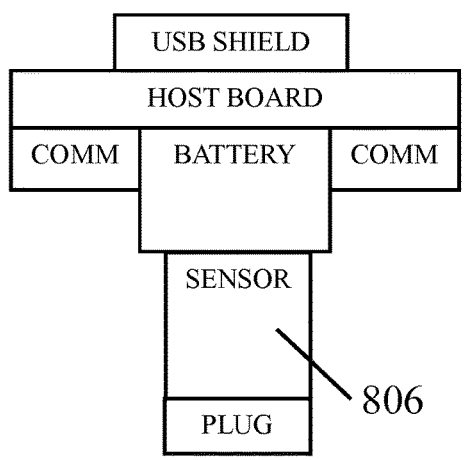

With reference to FIGS. 5 and 6, the sensor or sensors 506, 606*a*, 606*b* which detect movement of the RFC 502, 602 may be centrally located, such as at the volumetric center of the combined RFC unit 502, 602. As shown in FIG. 6, for example, the RFC 602 may include multiple sensors 606*a* and 606*b* that are so centrally located. Alternatively, the one or more sensors 706 may be positioned above the volumetric center, as shown in FIG. 7 or below, as shown in FIG. 8.

Preferably, the power source 702, such as a replaceable or rechargeable battery or other power plug (for a wired connection to an external power supply), is positioned adjacent to the bottom of the RFC housing 712 for gravity-based biasing in an orientation dependent setup.

The RFC 502 may optionally include an outermost layer 514 of resilient material, such as foam or rubber, to protect against incidental contact with a user's surroundings. The resilient layer 514 may completely surround the RFC housing 512, or may cover only a portion of the housing outer surface. Alternatively, the resilient layer, housing surface, or other material that comes into contact with the user's feet may include friction-increasing elements to increase the ease of controlling the RFC 502 as it rolls on the ground. The friction increasing elements may be in the form of rubber, foam, grip-tape, hooked loop materials, or plastic protrusions. Alternatively, the foam, housing surface, or other material that comes into contact with the floor or ground may include friction-increasing elements to help prevent the RFC 502 from slipping or sliding on the ground surface (i.e., movement of the RFC along the ground without pitch, roll, or yaw rotation).

Additionally, in a preferred embodiment, the electronic components of the RFC 502, 602 may reside within a foam block or other protective material (not shown), which is itself internal to the RFC housing, to stabilize and protect said components.

FIG. 9 shows an example of an RFC housing 912 with two separable parts in accordance with some embodiments. The RFC housing 912 may be divided into halves 904 and 906 with each half attachable to the other with any number of well-known fasteners 908, such as Velcro, other hook and loop fasteners, snaps, deformable plugs and apertures, and the like. The two halves 904, 906 may also be connected with a rotatable hinge (not shown) and releasable closure. The hinge may be living or made of two or more interlocking parts. The two halves 904, 906 may also be slidable to one another through interlocking tracks (not shown), or to give access to an interface for adjusting settings of the RFC 102. The ability to separate RFC halves 904, 906 facilitates overall device manufacture and replacement or modification of internal componentry. However, during use, the two halves 904, 906 of the RFC should be fixed with respect to one another.

FIG. 10 shows another example of an RFC housing 1012 with two separable parts 1004, 1006 and an additional middle flange layer 1011. The two parts 1004, 1006 are designed to fit on top of and below flange layer 1011, and to be secured so that all three parts are fixed to one another. Flange layer 1011 can be advantageous to some embodiments as it prevents excessive rotation in the pitch and roll directions, and when the sensors (not shown) are so programmed, indicated to the user when maximum pitch and roll conditions have occurred.

FIG. 11 shows an example of how the RFC halves 1104, 1106 and flange layer 1111 may be secured to one another. Fasteners 1136, such as screws, bolts, or posts and the like may extend through RFC halves 1104, 1106 and flange layer 1111 and create a fixed relationship between all three parts. Fasteners 1136 may be located so that they pass through the inside RFC housing 1112 or through the outside of RFC housing 1112, as shown.

FIG. 12 shows an example of how internal componentry may be arranged within a housing 1212 in accordance with some embodiments. When a flange layer 1211 is included, and it is not possible to place all of the internal componentry on one side or another of flange layer 1211 (preferably, the lower side), an aperture 1227 in flange layer 1211 may be used so that a lead or other electrical connector can join those components that are on one side of flange layer 1211 with those on the other side. It may be advantageous to have the heavier components (e.g., battery 1219), and those related to the heavier components (e.g., plug 1216), on the lower side of flange layer 1211 to aid in overall device stability. Optionally, aperture 1227 may be large enough for all of the internal componentry to extend across the plane of flange layer 1211 to fit, as opposed to the smaller lead or other electrical connector.

FIG. 13*a* shows an exterior side view and top view of an RFC 1302 in accordance with some embodiments. The RFC 1302 may include a flange 1311 which extends out from the regular contours of the housing halves 1304, 1306 to provide visual and tactile feedback to the user when the maximum pitch and roll has occurred, and prevents, to an extent, further pitch or roll. The flange 1311 may be located along an entire periphery of the RFC 1302 as shown in FIG. 13*a*, or may be in non-continuous discrete locations. The flange 1311 may be generally planar but may also take other shapes and thicknesses to set the desired maximum range of pitch and roll. The flange 1311 may be integral to or attached to either housing half 1304 or 1306, or may be attached to housing halves 1304, 1306 by, for example, stretching over and collapsing onto the housing half 1304, 1306 (elastic band), or by clipping around stopper flange sections on to the housing half 1304, 1306 (rigid cuff). In either configuration it is important to the function of flange 1311 that it be rigidly secured so as to not be displaced when it comes in contact with the rolling surface.

The flange 1311 may also take on various thicknesses and placements on the RFC 1302. For example, as shown in FIG. 13*b*, flange 1311 may be located along the centerline of RFC 1302, as opposed to below the centerline as shown in FIG. 13*a*. Flange 1311 may also be of various thicknesses, for example, as shown in FIG. 13*c*, a thickness that is sufficient to cover and protect interface components 1300 from incidental contact with the rolling surface or other object.

FIGS. 14*a*-14*e* show examples of RFC 1402 external shapes in accordance with some embodiments. Preferably, RFC 1402 is generally ball-shaped, but may take a number of other shapes depending on the intended gameplay and movement characteristics. Such shapes include, but are not limited to: spheres, truncated spheres with the truncation located on the bottom, truncated hemisphere halves, and polygon shapes as shown in FIG. 14*a*. Additionally, RFC 1402 may generally take an arc segment shape (e.g., banana-shaped) as shown in FIG. 14*c*. Additionally, RFC 1402 may be shaped as a bowl where the user's feet are intended to be placed within the bowl. FIG. 14*b* shows such an embodiment where the walls of the RFC 1402 have been sectioned to reduce weight and alter rolling profiles, and a center protuberance is included for placement of a user's feet thereon. In further embodiments shown in FIGS. 14*d* and 14*e*, the RFC housing 1402 takes a normal ball shape but includes discrete projections 1455 to provide visual and tactile feedback to the user, and to enhance friction between the RFC 1402, the user's feet, and the rolling surface. Such discrete projections 1455 also aid in establishing control over the RFC 1402 in digital step input amounts, rather than continuous analog inputs, which can be advantageous for some games which do not recognize continuous analog inputs for character movement.

FIGS. 15*a*-15*c* show the principles of motion of the RFC 1502 that may be detected by the RFC 1502 in accordance with some embodiments. With reference to FIG. 15*a*, the RFC 1502 may be configured to detect motion in the pitch forward and pitch backward directions. RFC 1502 shown in FIG. 15*a* takes, for example only, the shape of a prolate spheroid with upper half 1504 and lower half 1506 divided along the shown dotted line. The pitch forward direction may refer to a rolling in a first direction (e.g., forward with reference to the user) about the major (e.g., longest) axis of the prolate spheroid. The pitch backward direction may refer to a rolling in a second direction opposite the first direction (e.g., backward with reference to the user) along the same major axis of the prolate spheroid. With reference to FIG. 15*b*, the RFC 1502 may be capable of detecting motion in the roll left and roll right directions, where roll is understood as rotation of the RFC 1502 about a first minor axis, again with upper half 1504 and lower half 1506 shown divided by a dotted line. The roll left direction may be described generally as a downward slanting of the left side and an upward slanting of the right side of the RFC 1502 about the first minor axis. The roll right direction may refer to a downward slanting of the right side and an upward slanting of the left side of the RFC 1502 about the same first minor axis. With reference to FIG. 15*c*, the RFC 1502 may be capable of detecting motion in the yaw left and yaw right directions, where yaw is understood as rotation of the RFC 1502 about a second minor axis, with the forward half designated by 1524 and rear half designated by 1526. The yaw left direction may refer to pulling the left side towards the user and pushing the right side away from the user creating rotation about that second minor axis. The yaw right direction may refer to pushing the left side away from the user and pulling the right side towards the user creating rotation about that same second minor axis. The one or more sensors of the RFC 1502 may be configured to measure amounts of pitch, roll, and yaw rotations according to the orientation of the user.

With one or more feet placed upon the RFC 1502, the user may control the rotation of the device in each of the pitch, roll, and yaw directions as so described. Generally, if two feet are used, they are positioned symmetrically on left and right halves of the device making contact with a top face of the device. The user then rolls their feet forward and backward along the top face to generate pitch movement of the RFC 1502. If interpreted as a joystick movement by the computing device 104, this will create game character movement in the forward and backward directions. The user can also push either foot down along the top face of the RFC 1502 to generate left or right roll movement of the RFC housing 1502. If interpreted as a joystick movement by the console, this will create game character movement in the left and right directions. The user can also push or roll one foot and pull or roll the other along the top face to generate left or right yaw movement. This yaw rotation can serve as an additional source of input customized for any particular gameplay, but is not regularly associated with character movement, which has so far been generally limited to forward-backward, left-right movement. It should be appreciated that when lower housing half 1506 takes the shape of a half-prolate spheroid, pitch movement is more sensitive than roll movement because of the smaller radius of ground-contact curvature associated with that rotational direction.

Further embodiments adapted for use with a single foot are shown in FIGS. 16 and 17. In FIG. 16, RFC 1602 takes the shape of two merged prolate spheroids, with a first prolate spheroid 1604 positioned along its major axis in the forward or backward pitch direction, according to the orientation of the user, and half of a second prolate spheroid 1606 extending in a transverse direction from a midpoint of the first prolate spheroid 1604, forming a "T" shape. FIG. 17 shows another alternate embodiment in which the RFC 1702 takes a shape that is a merged combination of a prolate spheroid 1706 and a hemisphere 1704.

The two merged prolate spheroids and the prolate spheroid/hemisphere combinations provide for differing sensitivities depending on direction of movement. For example, as shown in the example motions of FIG. 18, rolling the prolate spheroid/hemisphere RFC 1802, with upper and lower halves 1804, 1806, to the left is more sensitive than rolling to the right at because the curvature of the prolate spheroid is steeper on the left than on the right.

FIG. 19 shows additional examples of RFC 1902 movement, where the RFC is again a merged prolate spheroid/hemisphere, with an additional flange 1911. As shown in FIG. 19, flange 1911, the asymmetric shape of RFC 1902 may require asymmetric extension of flange 1911 away from the housing halves 1904, 1906. As shown, flange 1911 extends further away on the right side than it does on the left. This serves match maximum roll amounts for the left and right directions while taking into account the difference in sensitivities from the differing radius of ground-contacting curvatures of the left and right sides.

Figure 20:
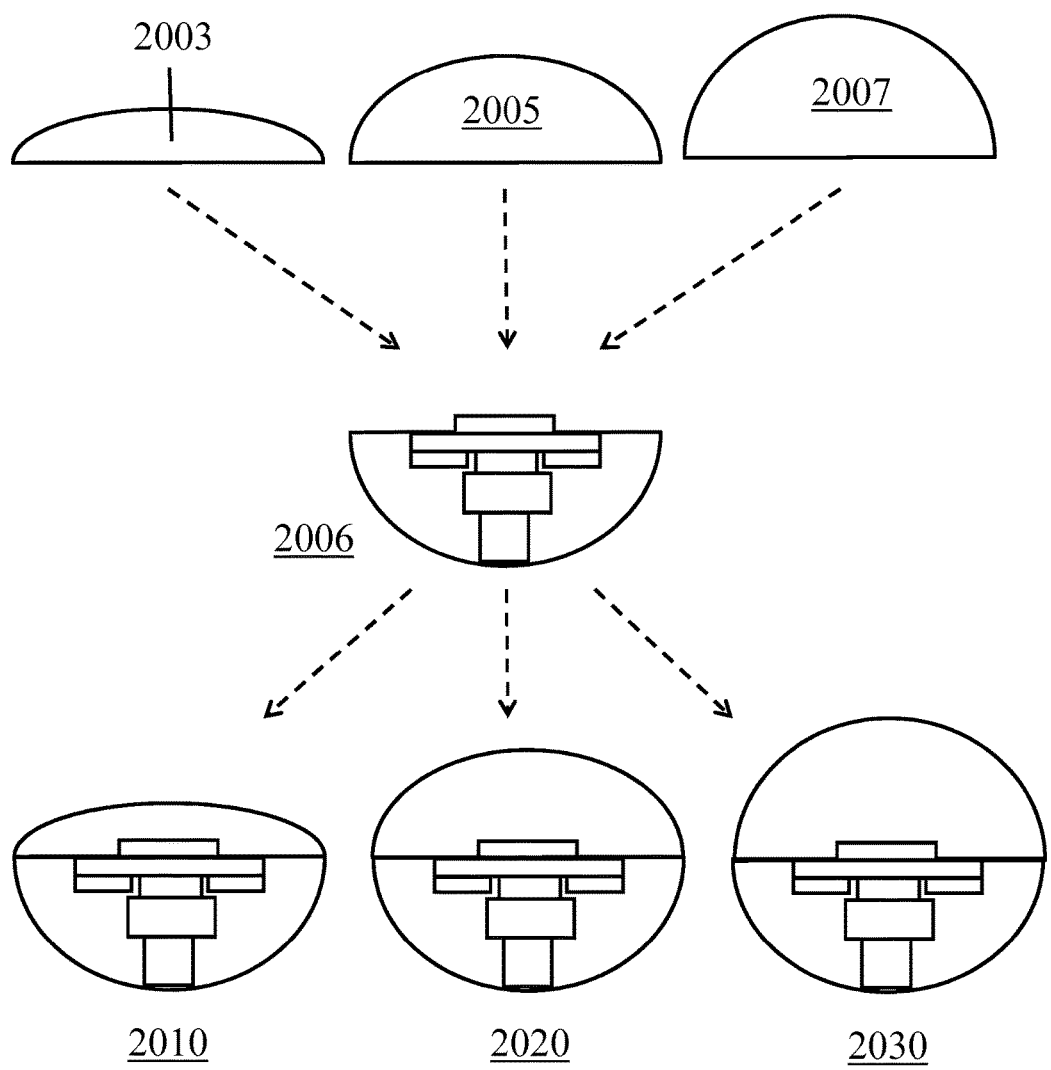
Figure 21A:
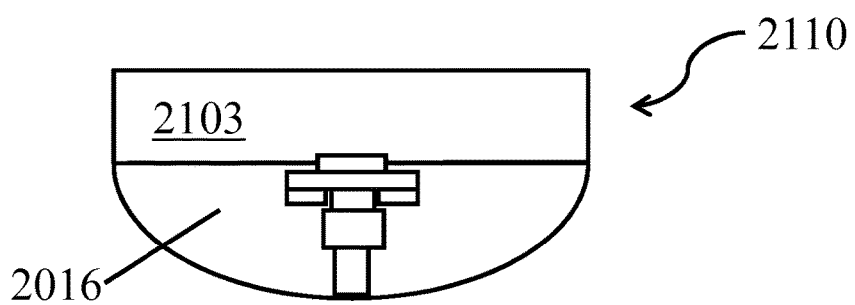
Figure 21B:
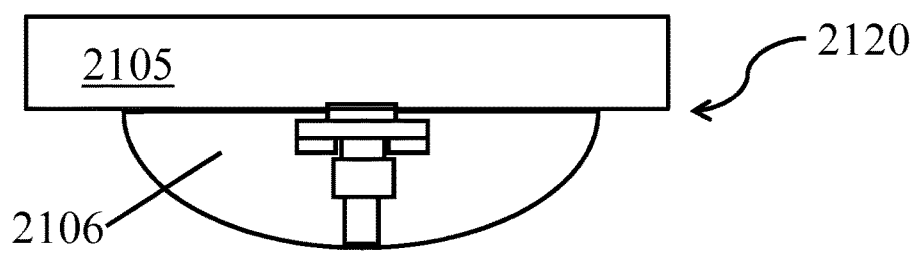
Figure 21C:
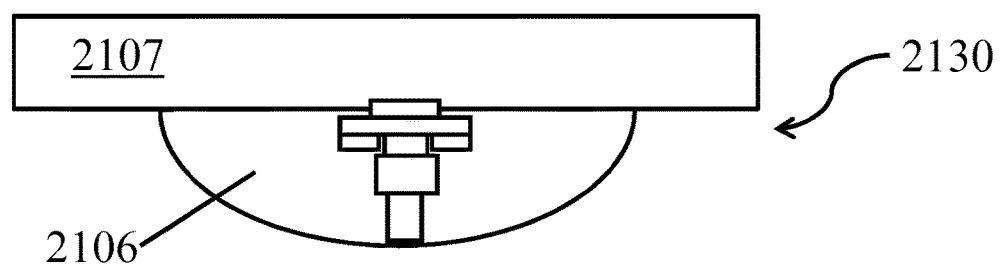

Similar to aforementioned embodiments discussed above in connection with FIGS. 9 and 10, certain other embodiments may be modular and customizable. As shown in FIG. 20, different upper halves 2003, 2005, 2007 may be separated and re-combined with a lower half 2006 to allow access to internal componentry and to adjust the user's experience with the device. The upper halves 2003, 2005, 2007 may have varying dimensions, such as increased or decreased curvature, as shown in FIG. 20, or increased or decreased lengths, as shown in FIG. 21 with upper halves 2103, 2105, 2107 and lower half 2106. This modularity serves to accommodate the varying sizes and shapes of user's feet, their preference for increased or decreased leverage, or the orientation of their particular seating.

22*a* and 22*b* show examples of an RFC 2202 including a ballast weight 2201 in accordance with some embodiments. Preferably, the ballast weight 2201 is located near the bottom of the RFC 2002, to act as a passive bias towards a neutral position for the device; particularly helpful in in orientation-dependent setups. The ballast weight 2201 may take any manner of shape, but preferably is spherical or oval disc-shaped. In some embodiments, a ballast weight 2201 may be internal to the housing RFC 2202 (FIG. 22*b*) or attached on a surface (FIG. 22*a*). Ballast weight 2201 or may be integral to the RFC housing or may be separately attachable and removable with other ballasts of varying shapes and weights.

FIGS. 23-37 show examples of devices with varying housing shapes intended for use with two feet. FIG. 23 shows rear, side, and isometric views of an example of an RFC 2302 in accordance with some embodiments. RFC 2302 may include a lower half 2306 that is half of a prolate ovoid and an upper half 2304 that is a half oval cylinder. Alternatively, upper half 2304 may be constitute less than a half oval cylinder (i.e., curvature of less than 180 degrees). It should be clarified here that the Applicants consider the term oval cylinders to include circular-cross section cylinders, in the same genus-species relationship as rectangles and squares. It should also be clarified that throughout this specification, recitation of a half-shape, such as half prolate ovoid or half cylinder, is also intended to include less-than-half shapes of the same configuration, where less-than-half means that the shape comprises less than 180 degrees of curvature on its convex side. In this configuration, the major axis of both the upper half 2304 and lower half 2306 are aligned with one another, and the user's feet are intended to be positioned on left and right sides of the top face of upper half 2304. As explained above, the user then rolls their feet forward and backward along the top face to generate pitch movement of the RFC 2302. The user can also push either foot down along the top face of the RFC 2302 to generate left or right roll movement. The user can further push or roll one foot and pull or roll the other along the top face to generate left or right yaw movement.

FIG. 24 shows rear and isometric views of an example of an RFC 2402 in accordance with some embodiments. RFC 2402 may include a lower half 2406 and an upper half 2404, where the lower half 2406 is again half of a prolate ovoid and the upper half 2404 is a half oval cylinder or less than a half oval cylinder. The embodiment of FIG. 24 further includes a flattened step 2408 which is a flattened surface along the central minor perimeter of lower half 2406 taking the profile of an oval cylinder. In this way, flattened surface 2408 serves to break up the curvature of the prolate ovoid 2406 that is in contact with the ground during use, and provides a visual and tactile feedback to the user that the RFC 2402 is located in a neutral left or right roll position during gameplay and any calibration. Flattened step 2408 may also be the result of a truncation of any side of the prolate ovoid lower half 2406. This flattened step 2408 may be fairly co-extensive with the shape of the lower half prolate ovoid, as shown in FIG. 24, or, as shown in FIG. 25, may be extend from the surface of lower half 2506, creating a raised step 2508 for the same beneficial effect. In other embodiments, similar steps may run along the perimeter of bottom halves 2406, 2506, respectively, at an angle perpendicular to the flattened step 2408 and raised step 2508 shown in FIGS. 24 and 25. These alternate flattened and raised steps likewise provide visual and tactile feedback to the user when the RFC 2402, 2502 is in the neutral pitch forward and backward position.

FIG. 26 shows examples of an RFC 2602 in accordance with some embodiments. RFC 2602 may include an upper half oval cylinder 2604 that includes recesses, cut-outs, or channels 2612 to aid in the positioning of the user's feet on the top face of the RFC 2602, and to enhance control at the extremes of the RFC 2602 range of motion.

Figure 27:
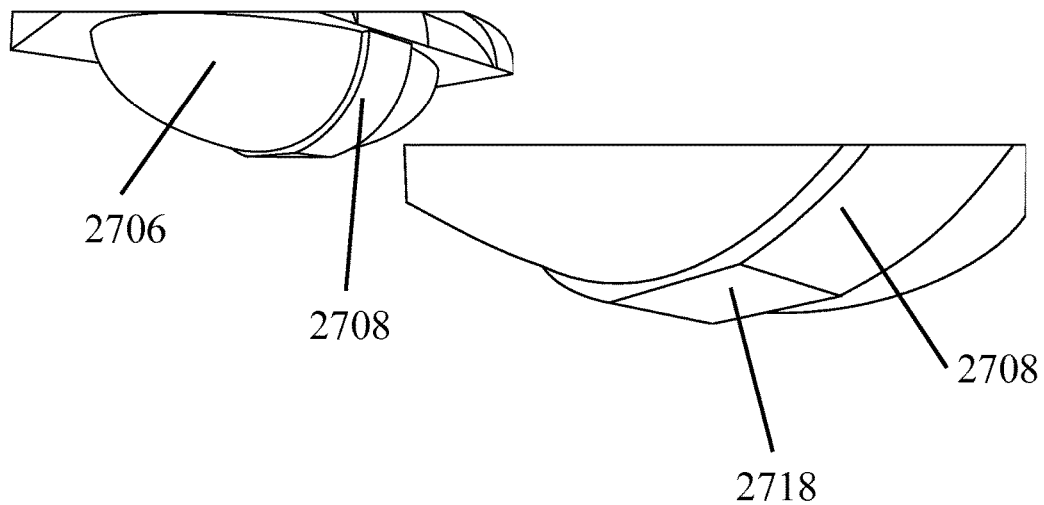

FIG. 27 shows an example of a further feature that can be included to aid the user in determining when the device is in a neutral position in accordance with some embodiments. As shown, raised step 2708 may be truncated at a central bottom-most point to create a flat face 2718. This flat face 2718 serves as an additional indicator to the user of when the device is in a neutral position for both the forward-backward pitch and left-right roll directions during gameplay and any calibration. Preferably, the flat face 2718 is not so truncated to become co-extensive with the curvature of the lower half 2706. Rather the presence of a small step is preserved between the raised step 2708 and the remainder of the lower half 2706 surface.

Figure 28:
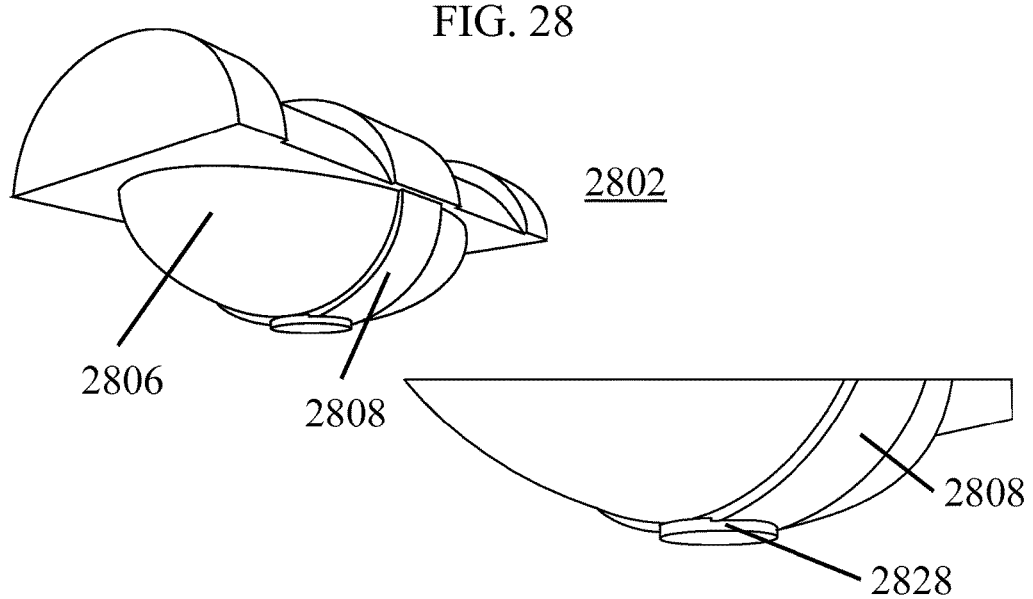

FIG. 28 shows an example of a similar feature to that shown in FIG. 27, wherein raised step 2808 may include a protuberance 2828 in accordance with some embodiments. Protuberance 2828 is placed in the same central bottom-most point of lower half 2806, and can be of spherical, cylindrical, or square-shaped, but in all embodiments creates an additional step which provides tactile feedback to the user that the RFC 2802 is located in the neutral pitch and roll position. Protuberance 2828 may also be used in conjunction with the flattened step 2408 of FIG. 24.

FIGS. 29, 30*a*, and 30*b* show rear and isometric views of an example of an RFC 2902 in accordance with some embodiments. The RFC 2902 may include extensions 2922 to the upper half 2904 which extend further in the left and right directions, and are angled upwards as well. These extensions 2922, or wings, are curved similarly to the remainder of the upper half 2904 and serve to allow increase the user's ability to bank the RFC 2902 for left-right roll rotation (see FIGS. 30*a* and 30*b*) while preserving the contact between the upper half 2904 and the user's feet.

Thus, the user's ability to control pitch movement at extreme roll positions is preserved as well. In an alternate embodiment, portions of the extensions 2922 can extend downwards to clip or attach the RFC housing upper half 2904 to the bottom half 2906.

FIG. 31 shows an example of an RFC 3102 including a built in display in accordance with some embodiments. The RFC 3102 may be free of any internal electronic components and designed to work with a portable computing device 3140 that serves as a game console, display, and controller all-in-one (for example gameplay on a smartphone or tablet computer). In this instance, the RFC 3102 can serve as a way for a user's feet to interact with that device, instead of with their hands. To accommodate this style of gameplay, a recess (not shown due to placement of portable computing device 3140), or other compartment is placed centrally on the upper side of the upper half 3104 of the RFC housing. Preferably, the recess is angled so as to face the user when a normal user sitting position is assumed. Alternatively, the recess can be mounted on a movable counterbalanced structure to maintain a position relative to a user's eyesight line.

Figure 32:
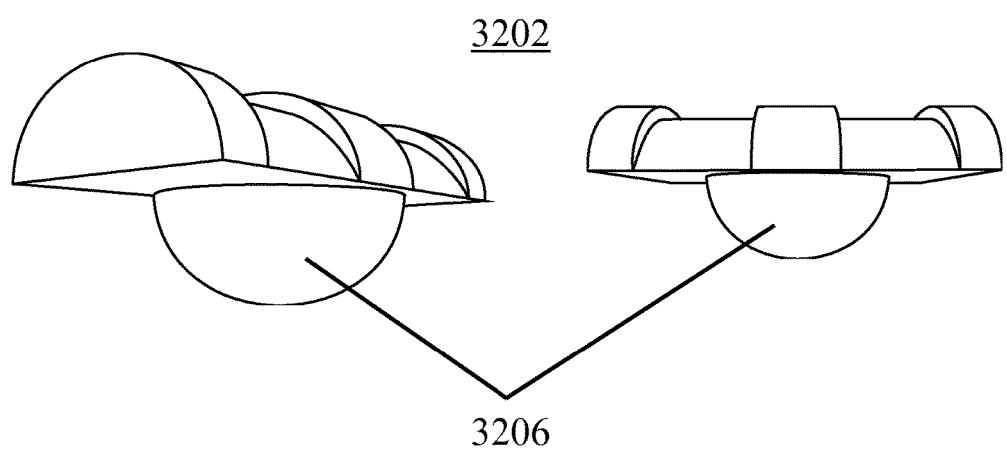

FIG. 32 shows an example of an RFC 3202 in accordance with some embodiments. The lower half 3206 of the RFC 3202 is a hemisphere or a portion of a hemisphere (i.e., less than 180 degrees curvature). This has the advantage of giving uniform rotation characteristics relating to pitch and roll, as far as the influence of the lower half 3206 has on the overall user experience.

Figure 33:
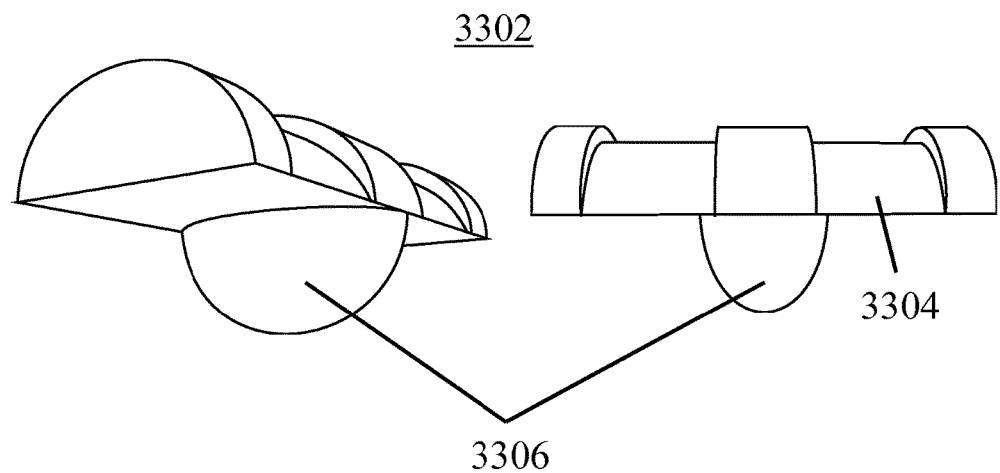

FIG. 33 shows an example of an RFC 3302 in accordance with some embodiments. The lower half 3306 of the RFC 3302 is a prolate ovoid, but is aligned with its major axis along the minor axis of the upper half 3304 of the RFC 3302. This design allows for more sensitivity in the left-right roll directions, as the angle of curvature of lower half 3306 is steepest on the left and right sides as compared to the front and rear sides. In general, if a particular gameplay would benefit from greater sensitivity in the left-right roll direction than in the forward-backward pitch direction, than the angles of any lower RFC housing half can be so adjusted, where a sharper angle of curvature results in more sensitivity.

FIG. 34 shows rear, isometric, and side exploded views of an example of an RFC 3402 in accordance with some embodiments. RFC 3402 may include a flange layer 3411 which is separate from and positioned between the upper half 3404 and the lower half 3406. Additionally, the upper half 3404 is open on one or both ends to facilitate access to and cooling of any electronic componentry. The lower half 3406 is shown in FIGS. 34a-34c as a half prolate ovoid, but may optionally be a hemisphere or less than half a hemisphere (i.e., less than 180 degrees curvature). Flange layer 3411 is also shown in FIGS. 34a-34c as having an oval shape (when viewed from above) to match the curvature of lower half 3406, but it may alternatively be circular with a uniform radius, depending on user preferences. The upper half 3404, flange layer 3411, and lower half 3406 may be selectively releasable so as to also facilitate access to and replacement of any housing section or internal componentry, as explained above in reference to FIGS. 9-11. FIG. 35 shows how the upper half 3504, flange layer 3511, and lower half 3506 of RFC 3502 appear when secured together.

FIG. 36 show rear and isometric views of an example of an RFC 3602 in accordance with some embodiments. Here, RFC 3602 includes lower half 3606, raised step 3608, flange layer 3611, and upper half 3604 with channels 3612. Lower half 3606 is shown as a prolate ovoid but may alternatively take the shape of a hemisphere or less than a hemisphere (i.e., less than 180 degrees curvature). Upper half 3604 is shown as having closed ends, but may alternatively have open ends as shown in FIGS. 34 and 35. Flange layer 3611 is shown as an oval shape (when viewed from above) to match the curvature of lower half 3606, but it may alternatively be circular with a uniform radius, depending on user preferences.

FIG. 37 shows an example of an RFC 3702 in accordance with some embodiments. Here, there is no flange layer, and instead, the upper half 3704 is dimensioned and positioned to extend past the perimeter of lower half creating an overhang 3762 which acts as a similar range-of motion inhibitor. Preferably, upper half 3704 includes curve segments 3760 which, when viewed from the top, create a similar curvature profile to that of lower half 3706. In the alternative, upper half 3704 may be of a curvature profile that differs from that of a lower half 3706, such as when lower half 3706 is a half prolate ovoid and upper half 3704, when viewed from above, is circular with uniform radius.

CONCLUSION

Many modifications and other embodiments will come to mind to one skilled in the art to which these embodiments pertain having the benefit of the teachings presented in the foregoing descriptions and the associated drawings. A feature of an embodiment herein described is generally compatible with the features of other embodiments. For example, prolate ovoids or spheroids may be combined with half cylinders to create RFC housings, recesses or cutouts for users feet may be incorporated into double transverse prolate spheroid housings, flange layers may be of a curvature that matches lower halves or may take a different curvature, flange layers may also be combined with prolate truncated spheres or any other lower half shapes, top RFC half extensions may be combined with prolate spheroid housing halves, prolate ovoid lower halves may be combined with circular stopper flanges, etc. Therefore, it is to be understood that embodiments and implementations are not to be limited to the specific examples disclosed and that modifications and other embodiments are intended to be included within the scope of the following claims.

That which is claimed:
1. A rolling foot controller, comprising:
  a housing including:
    an upper portion of the housing configured to interface with one or more feet;
    said upper portion of the housing substantially defining a horizontal cylindrical segment; and
    a lower portion substantially defining a horizontal prolate spheroid segment configured to facilitate motion of the rolling foot controller when the lower portion is disposed on a surface;
    the upper portion of the housing defines a major axis of the horizontal cylindrical segment along its horizontal axis;
    the upper portion configured to interface with the one or more feet includes the upper portion being configured to interface with a first foot and a second foot aligned substantially in parallel with each other along a direction that is perpendicular to the major axis of the upper portion;
    the lower portion of the housing defines a major axis of the horizontal prolate spheroid segment along its horizontal axis; and the major axis of the horizontal cylindrical segment and the major axis of the horizontal prolate spheroid segment are parallel to each other;

wherein the housing further includes a stopper flange configured to constrain a range of the motion of the rolling foot controller when the lower portion of the housing is placed on a surface;

one or more motion sensors disposed within the housing, the one or more motion sensors configured to generate motion data indicating the motion of the rolling foot controller; and processing circuitry configured to:
receive the motion data from the one or more motion sensors; and
provide the motion data to a computing device.

2. The rolling foot controller of claim 1, wherein the horizontal cylindrical segment of the upper portion has a greater length dimension than the horizontal prolate spheroid segment of the lower portion.

3. The rolling foot controller of claim 2, wherein the upper portion of the housing includes one or more channels configured to facilitate placement of the one or more feet.

4. The rolling foot controller of claim 3, wherein the upper portion of the housing includes a base portion and an extension portion defined at each end of the base portion; and
the extension portion defined at each end of the base portion is angled with respect to the base portion.

5. The rolling foot controller of claim 2, wherein the horizontal prolate spheroid segment of the lower portion has a flat face with a neutral position.

6. The rolling foot controller of claim 2, wherein the upper portion of the housing defines a holster; said holster is generally rectangular in shape and of a size to accommodate a smartphone or tablet shaped computing device; and said holster is located on an outside face of said upper portion.

7. The rolling foot controller of claim 2, wherein the upper portion and the lower portion of the housing are configured to be separable from each other and reattachable.

8. The rolling foot controller of claim 1, wherein the horizontal cylindrical segment of the upper portion has a lesser height dimension than the horizontal prolate spheroid segment of the lower portion.

9. The rolling foot controller of claim 8, wherein the upper portion of the housing includes one or more channels configured to facilitate placement of the one or more feet.

10. The rolling foot controller of claim 9, wherein the upper portion of the housing includes a base portion and an extension portion defined at each end of the base portion; and
the extension portion defined at each end of the base portion is angled with respect to the base portion.

11. The rolling foot controller of claim 8, wherein the horizontal prolate spheroid segment of the lower portion has a flat face with a neutral position.

12. The rolling foot controller of claim 8, wherein the upper portion of the housing defines a holster; said holster is generally rectangular in shape and of a size to accommodate a smartphone or tablet shaped computing device; and said holster is located on an outside face of said upper portion.

13. The rolling foot controller of claim 8, wherein the upper portion and the lower portion of the housing are configured to be separable from each other and reattachable.

14. The rolling foot controller of claim 1, wherein the upper portion of the housing includes one or more channels configured to facilitate placement of the one or more feet.

15. The rolling foot controller of claim 14, wherein the upper portion of the housing includes a base portion and an extension portion defined at each end of the base portion; and
the extension portion defined at each end of the base portion is angled with respect to the base portion.

16. The rolling foot controller of claim 1, wherein the horizontal prolate spheroid segment of the lower portion has a flat face with a neutral position.

17. The rolling foot controller of claim 1, wherein the upper portion of the housing defines a holster; said holster is generally rectangular in shape and of a size to accommodate a smartphone or tablet shaped computing device; and said holster is located on an outside face of said upper portion.

18. The rolling foot controller of claim 1, wherein the upper portion and the lower portion of the housing are configured to be separable from each other and reattachable.

* * * * *